US012197225B2

(12) United States Patent
Kikumoto et al.

(10) Patent No.: US 12,197,225 B2
(45) Date of Patent: Jan. 14, 2025

(54) WORKING VEHICLE CAPABLE OF SETTING SCHEDULED TRAVELING LINE FOR TRAVELING USING AUTOMATIC STEERING

(71) Applicant: KUBOTA CORPORATION, Osaka (JP)

(72) Inventors: Misako Kikumoto, Sakai (JP); Kunihiko Nishino, Sakai (JP); Yasuaki Morioka, Sakai (JP); Hideaki Ezaki, Sakai (JP); Shunsuke Miyashita, Sakai (JP); Toru Tambo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 393 days.

(21) Appl. No.: 17/554,075

(22) Filed: Dec. 17, 2021

(65) Prior Publication Data

US 2022/0107649 A1    Apr. 7, 2022

Related U.S. Application Data

(63) Continuation of application No. PCT/JP2020/022695, filed on Jun. 9, 2020.

(30) Foreign Application Priority Data

Sep. 26, 2019   (JP) .................. 2019-175925

(51) Int. Cl.
*G05D 1/02* (2020.01)
*A01B 69/04* (2006.01)
(Continued)

(52) U.S. Cl.
CPC ......... *G05D 1/0219* (2013.01); *A01B 69/008* (2013.01); *A01B 76/00* (2013.01);
(Continued)

(58) Field of Classification Search
CPC .......... G05D 1/0219; G05D 2201/0201; A01B 69/008; A01B 76/00; B60K 35/00;
(Continued)

(56) References Cited

U.S. PATENT DOCUMENTS 6,050,359 A * 4/2000 Mouri ...................... B62D 6/00
                                                                  180/168
6,876,920 B1 * 4/2005 Mailer ................. G05D 1/0278
                                                                  701/470
(Continued)

FOREIGN PATENT DOCUMENTS

AU   2017203877 A1   1/2018
CN   109074081 A    12/2018
(Continued)

OTHER PUBLICATIONS

Official Communication issued in corresponding Japanese Patent Application No. 2023-027368, mailed on Feb. 20, 2024, 4 pages.
(Continued)

*Primary Examiner* — Andrew R Dyer
(74) *Attorney, Agent, or Firm* — Keating & Bennett, LLP

(57) ABSTRACT

A working vehicle includes a vehicle body to travel either by manual steering with a steering wheel or by automatic steering with the steering wheel, a reference registration controller configured or programmed to register a traveling reference line based on a position of the vehicle body caused to travel by the manual steering, a traveling line setter configured or programmed to set, based on the traveling reference line, scheduled traveling lines for traveling using the automatic steering, and an automatic steering controller to control the automatic steering based on the scheduled traveling lines. The traveling line setter is configured or programmed to change an adjacency width between the
(Continued)

scheduled traveling lines adjoining each other among the plurality of scheduled traveling lines.

5 Claims, 24 Drawing Sheets

(51) Int. Cl.
| | |
|---|---|
| *A01B 76/00* | (2006.01) |
| *B60K 35/00* | (2006.01) |
| *G05D 1/00* | (2006.01) |
| *G07C 5/12* | (2006.01) |
| *B60K 35/10* | (2024.01) |
| *B60K 35/28* | (2024.01) |
| *B62D 49/00* | (2006.01) |

(52) U.S. Cl.
CPC ............... *B60K 35/00* (2013.01); *G07C 5/12* (2013.01); *B60K 35/10* (2024.01); *B60K 35/28* (2024.01); *B60K 2360/16* (2024.01); *B62D 49/00* (2013.01)

(58) Field of Classification Search
CPC ............ B60K 2370/10; B60K 2370/16; B60K 2370/152; B60K 2370/166; B60K 2370/168; B60K 2370/175; B60K 37/06; G07C 5/12; B62D 49/00; B62D 6/00; B60Y 2200/221; B60Y 2200/22
USPC .......................................................... 701/41
See application file for complete search history.

(56) References Cited

U.S. PATENT DOCUMENTS

| | | | | |
|---|---|---|---|---|
| 7,451,030 | B2 * | 11/2008 | Eglington ............ | G05D 1/0221 |
| | | | | 701/410 |
| 7,729,834 | B2 * | 6/2010 | Meyer Zu Helligen ..................... | |
| | | | | G01C 21/20 |
| | | | | 701/25 |
| 8,131,432 | B2 * | 3/2012 | Senneff ................ | A01B 69/007 |
| | | | | 701/437 |
| 8,170,785 | B2 * | 5/2012 | Diekhans ............. | G05D 1/0291 |
| | | | | 701/25 |
| 8,285,459 | B2 * | 10/2012 | Diekhans ............. | A01B 69/007 |
| | | | | 701/411 |
| 2004/0210357 | A1 * | 10/2004 | McKay ................ | G05D 1/0278 |
| | | | | 318/587 |
| 2007/0050117 | A1 * | 3/2007 | Kitzler ................. | A01B 69/008 |
| | | | | 701/41 |
| 2007/0233348 | A1 * | 10/2007 | Diekhans ............. | G05D 1/0291 |
| | | | | 701/50 |
| 2007/0255470 | A1 * | 11/2007 | Diekhans ............. | A01B 69/008 |
| | | | | 701/50 |
| 2010/0185366 | A1 * | 7/2010 | Heiniger .............. | G05D 1/0278 |
| | | | | 700/12 |
| 2017/0177002 | A1 * | 6/2017 | Ogura ................. | G05D 1/0295 |
| 2018/0338407 | A1 * | 11/2018 | Matsuzaki ............... | B60T 7/18 |
| 2019/0101931 | A1 * | 4/2019 | Ogura ................. | G05D 1/0016 |
| 2019/0146511 | A1 * | 5/2019 | Hurd ..................... | G06F 18/251 |
| | | | | 701/27 |
| 2021/0136994 | A1 * | 5/2021 | van Haaren ......... | A01B 79/005 |
| 2022/0107649 | A1 | 4/2022 | Kikumoto et al. | |
| 2022/0287218 | A1 | 9/2022 | Yuasa et al. | |

FOREIGN PATENT DOCUMENTS

| | | | | |
|---|---|---|---|---|
| CN | 109716903 | A | 5/2019 | |
| EP | 3351419 | A1 * | 7/2018 | .......... A01B 69/008 |
| JP | 09-120313 | A | 5/1997 | |
| JP | 2015-008657 | A | 1/2015 | |
| JP | 2016-189171 | A | 11/2016 | |
| JP | 2017-123803 | A | 7/2017 | |
| JP | 2018041358 | A | 3/2018 | |
| JP | 2018-092401 | A | 6/2018 | |
| JP | 2019-013224 | A | 1/2019 | |
| JP | 2019-054746 | A | 4/2019 | |
| JP | 2019-115280 | A | 7/2019 | |
| JP | 2022141260 | A | 9/2022 | |
| JP | 2023059973 | A | 4/2023 | |

OTHER PUBLICATIONS

Official Communication issued in corresponding Chinese Patent Application No. 202080043873.4, mailed on Mar. 8, 2023, 10 pages.
Official Communication issued in corresponding Indian Patent Application No. 202117058618, mailed on Jul. 13, 2022, 6 pages.
Official Communication issued in International Patent Application No. PCT/JP2020/022695, mailed on Aug. 25, 2020, 4 pages.
Official Communication issued in corresponding Japanese Patent Application No. 2024-067803, mailed on Aug. 6, 2024, 5 pages.

\* cited by examiner

WORKING VEHICLE CAPABLE OF SETTING SCHEDULED TRAVELING LINE FOR TRAVELING USING AUTOMATIC STEERING

CROSS REFERENCE TO RELATED APPLICATIONS

This application is a continuation application of International Application No. PCT/JP2020/022695, filed on Jun. 9, 2020, which claims the benefit of priority to Japanese Patent Application No. 2019-175925, filed on Sep. 26, 2019. The entire contents of each of these applications are hereby incorporated herein by reference.

BACKGROUND OF THE INVENTION

1. Field of the Invention

The present invention relates to a working vehicle, for example.

2. Description of the Related Art

Conventionally, an agricultural working machine such as disclosed in Japanese Unexamined Patent Publication No. 2017-123803 has been known. The agricultural working machine in Japanese Unexamined Patent Publication No. 2017-123803 has a traveling machine body that travels along a set traveling line parallel to a traveling reference line, either one of manual traveling by using manual steering and automatic traveling by using automatic steering being determined as the traveling of the traveling machine body, and a changeover switch switchable between a manual traveling setting state and an automatic traveling setting state. Also, the agricultural working machine has a right instruction button and a left instruction button such that, during traveling thereof along a ridge, a start point of the traveling reference line is set by pressing the right instruction button, and an end point of the traveling reference line is set by pressing the left instruction button. That is, the traveling reference line is set before using automatic steering.

SUMMARY OF THE INVENTION

In the agricultural working machine of Japanese Unexamined Patent Publication No. 2017-123803, by switching of the changeover switch from the manual traveling setting state to the automatic traveling setting state, the automatic traveling can be easily performed. The set traveling line in Japanese Unexamined Patent Publication No. 2017-123803 has a constant interval, which cannot be arbitrarily changed.

Preferred embodiments of the present invention provide working vehicles each allowing automatic steering to be easily performed in correspondence to the working situation.

A working vehicle according to a preferred embodiment of the present invention may include a vehicle body to travel either by manual steering with a steering wheel or by automatic steering with the steering wheel, a reference registration controller configured or programmed to register a traveling reference line based on a position of the vehicle body caused to travel by the manual steering, a traveling line setter configured or programmed to set, based on the traveling reference line, a plurality of scheduled traveling lines for traveling using the automatic steering, and an automatic steering controller configured or programmed to control the automatic steering based on the scheduled traveling lines. The traveling line setter is configured or programmed to change an adjacency width between the scheduled traveling lines adjoining each other among the plurality of scheduled traveling lines.

A working vehicle according to a preferred embodiment of the present invention may further include a changing operation controller configured or programmed to issue therefrom an instruction to change of the adjacency width. The traveling line setter is configured or programmed to change the adjacency width when the instruction to change is issued from the changing operation controller.

A working vehicle according to a preferred embodiment of the present invention may further include a calculator to calculate a work count that is a count of a number of times of performing a ground work. The traveling line setter may be configured or programmed to change the adjacency width based on a predetermined count reached by the work count calculated by the calculator.

A working vehicle according to a preferred embodiment of the present invention may further include a display including a reference input portion to input a reference adjacency width, which is a reference width between the scheduled traveling lines adjoining each other, and a variation input portion to input a variation adjacency width. The traveling line setter may be configured or programmed to change the adjacency width based on the reference adjacency width and the variation adjacency width.

A working vehicle according to a preferred embodiment of the present invention may further include a display including a reference input portion to input a reference adjacency width, which is a reference width between the scheduled traveling lines adjoining each other, and a variation input portion to input a variation adjacency width. The traveling line setter may be configured or programmed to change the adjacency width to a value obtained by adding the variation adjacency width to the reference adjacency width when the instruction to change is issued from the changing operation controller, and set the reference adjacency width as the adjacency width when the instruction to change is not issued from the changing operation controller.

A working vehicle according to a preferred embodiment of the present invention may further include a reference input portion to input a reference adjacency width, which is a reference width between the scheduled traveling lines adjoining each other, and a variation input portion to input a variation adjacency width. The traveling line setter may be configured or programmed to change the adjacency width to a value obtained by adding the variation adjacency width to the reference adjacency width when the work count calculated by the calculator reaches a predetermined count, and set the reference adjacency width as the adjacency width when the work count does not reach the predetermined count.

A working vehicle according to a preferred embodiment of the present invention may further include a first assist controller configured or programmed so that, when the adjacency width is unchanged, the first assist controller automatically guides, after the automatic steering is terminated, the vehicle body to the scheduled traveling lines with the unchanged adjacency width, and a second assist controller configured or programmed so that, when the adjacency width is changed, the second assist controller automatically guides, after the automatic steering is terminated, the vehicle body to the scheduled traveling lines with the changed adjacency width.

A working vehicle according to a preferred embodiment of the present invention may further include a display to display information about the vehicle body, and a display controller configured or programmed to cause the display to display the scheduled traveling line on which the vehicle body travels and a next-scheduled traveling line adjoining the scheduled traveling line. When an adjacency width between scheduled traveling lines adjoining each other is changed, the display controller may be configured or programmed to cause the display to display the next-scheduled traveling line to be scheduled after the changing.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 8 is a diagram depicting one example of a home setting screen M3a.

DETAILED DESCRIPTION OF THE PREFERRED EMBODIMENTS

Figure 1:
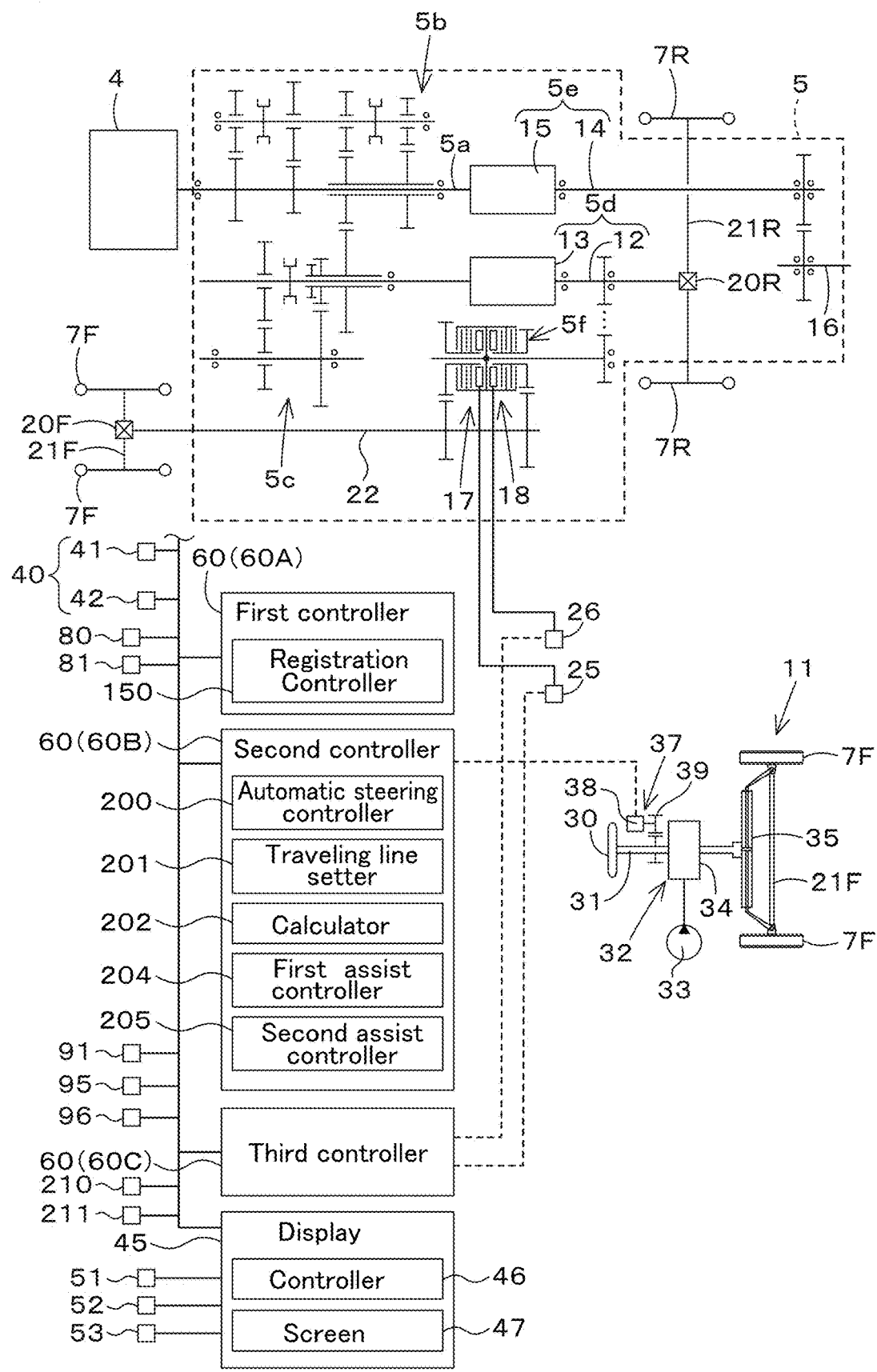
FIG. 1 is a view depicting a configuration of a tractor and depicting a control block diagram.

The preferred embodiments will now be described with reference to the accompanying drawings, wherein like reference numerals designate corresponding or identical elements throughout the various drawings. The drawings are to be viewed in an orientation in which the reference numerals are viewed correctly.

In the following, one preferred embodiment of the present invention is described based on the drawings.

Figure 18:
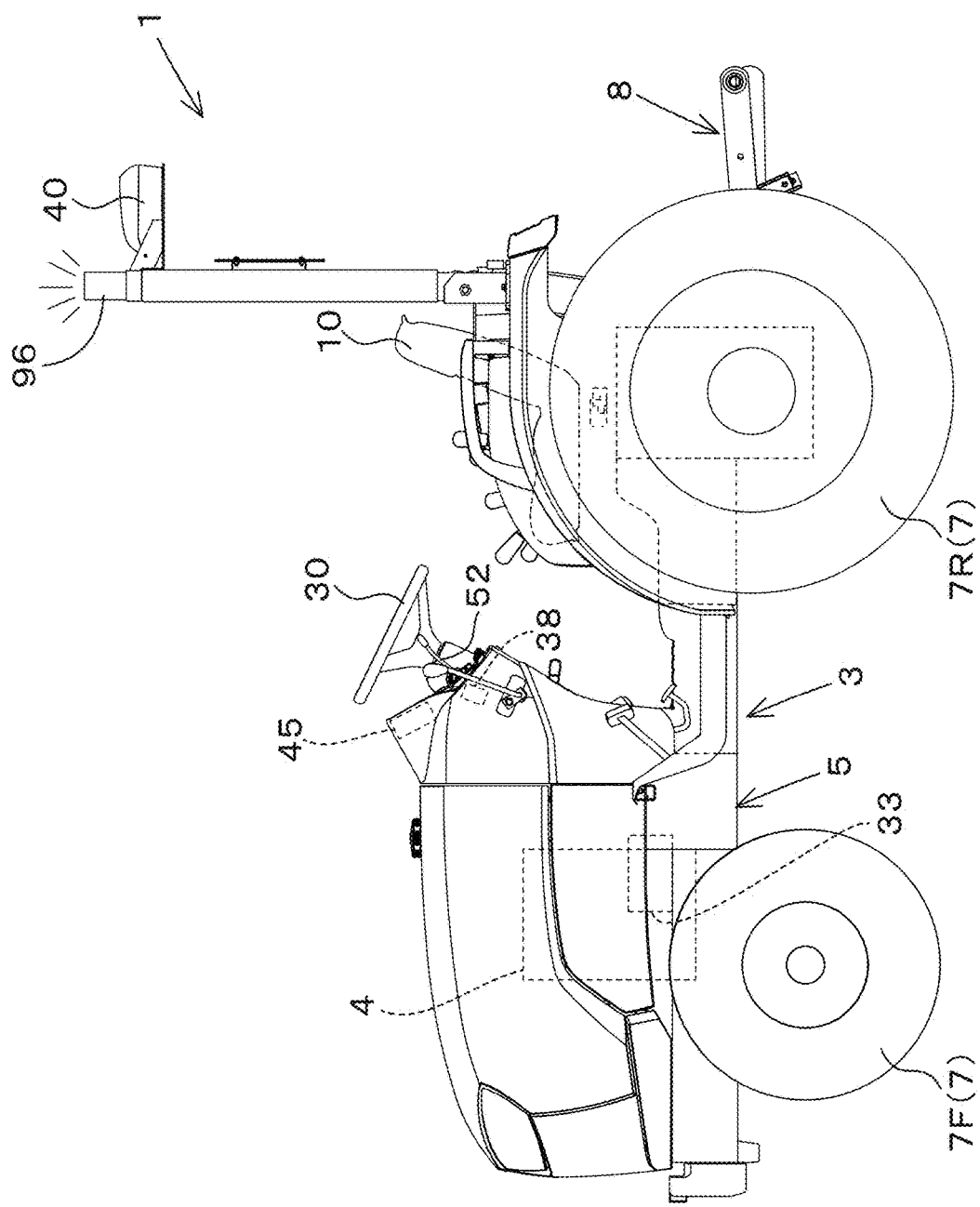
FIG. 18 is a general view of the tractor.

FIG. 18 is a side view depicting one preferred embodiment of a working vehicle 1, and FIG. 18 is a plan view depicting one preferred embodiment of the working vehicle 1. In the present preferred embodiment, the working vehicle 1 is a tractor. However, the working vehicle 1 is not limited to a tractor but may be agricultural machine (agricultural vehicle) such as a combine or a transplanter or may be construction machine (construction vehicle) or the like such as a loader.

FIG. 18 is a side view depicting the working vehicle 1. By using FIG. 18 and so forth, the tractor (working vehicle) 1 is described. In the following, description is made by taking a front side of an operator sitting on an operator's seat 10 of the tractor (working vehicle) 1 as forward, a rear side of the operator as rearward, a left side of the operator as leftward, and a right side of the operator as rightward. Also, description is made by taking a horizontal direction, which is a direction orthogonal to a fore-and-aft direction of the working vehicle 1, as a vehicle body width direction.

As depicted in FIG. 18, the tractor 1 includes a vehicle body 3, a prime mover 4, a transmission 5. The vehicle body 3 has a traveling device 7 and is capable of traveling. The traveling device 7 is a device having front wheels 7F and rear wheels 7R. The front wheels 7F may be of a tire type or a crawler type. Also, the rear wheels 7R may be of a tire type or a crawler type.

The prime mover 4 is a diesel engine, an electric motor, or the like. In this preferred embodiment, the prime mover 4 is a diesel engine. The transmission 5 is capable of switching the driving force of the traveling device 7 by speed shifting, and is also capable of switching between forward traveling and rearward traveling of the traveling device 7. The operator's seat 10 is provided in the vehicle body 3.

Also, a coupling portion 8 is provided at a rear portion of the vehicle body 3. A three-point linkage mechanism or the like serves as the coupling portion 8. The working device 2 is attachable to and detachable from the coupling portion 8. By coupling the working device 2 to the coupling portion 8, the working device 2 can be towed by the vehicle body 3. The working device 2 is a tiller for tilling, a fertilizer spreader for spreading fertilizer, an agricultural chemical spreader for spreading agricultural chemicals, a harvester for harvesting, a mower for mowing grass or the like, a ridger for ridging, or the like, and is a device for performing a work (ground work) on a ground such as an agricultural field.

As depicted in FIG. 1, the transmission 5 includes a main shaft (propeller shaft) 5a, a main speed shifting unit 5b, a sub-speed shifting unit 5c, a shuttle unit 5d, a PTO power transmission unit 5e, and a front speed shifting unit 5f. The propeller shaft 5a is rotatably supported by a housing case (transmission case), and power from the crank shaft of the prime mover 4 is transmitted to the propeller shaft 5a. The main speed shifting unit 5b has a plurality of gears and a shifter for changing connection of the gears. By changing the connection (engagement) of the plurality of gears as appropriate with the shifter, the main speed shifting unit 5b changes and outputs rotation inputted from the propeller shaft 5a (changes speed).

Similar to the main speed shifting unit 5b, the sub-speed shifting unit 5c has a plurality of gears and a shifter for changing connection of the gears. By changing the connection (engagement) of the plurality of gears as appropriate with the shifter, the sub-speed shifting unit 5c changes rotation speed and outputs the speed-changed rotation inputted from the main speed shifting unit 5b.

The shuttle unit 5d has a shuttle shaft 12 and a forward-rearward traveling switching unit 13. The power outputted from the sub-speed shifting unit 5c is transmitted to the shuttle shaft via gears and the like. The forward-rearward traveling switching unit 13 includes, for example, a hydraulic clutch or the like, which is clutched on and off to switch the rotating direction of the shuttle shaft 12, that is, set whether forward traveling or rearward traveling of the tractor 1. The shuttle shaft 12 is connected to a rear-wheel differential device 20R. The rear-wheel differential device 20R rotatably supports a rear axles 21R to which the rear wheels 7R are attached.

The PTO power transmission unit 5e has a PTO propeller shaft 14 and a PTO clutch 15. The PTO propeller shaft 14 is rotatably supported, and is capable of transmitting power from the propeller shaft 5a. The PTO propeller shaft 14 is connected to a PTO shaft 16 via gears or the like. The PTO clutch 15 is, for example, a hydraulic clutch or the like, which is configured to be engaged and disengaged to switch a transmission state between a state of transmitting power of the propeller shaft 5a to the PTO propeller shaft 14 and a state of not transmitting power of the propeller shaft 5a to the PTO propeller shaft 14.

The front speed shifting unit 5f has a first clutch 17 and a second clutch 18. The first clutch 17 and the second clutch 18 are capable of transmitting power from the propeller shaft 5a and power from the shuttle shaft 12 is transmitted via gears and a line shaft. Power from the first clutch 17 and the second clutch 18 can be transmitted via a front line shaft 22 to a front axle shaft 21F. Specifically, the front line shaft 22 is connected to a front-wheel differential device 20F, and the front-wheel differential device 20F rotatably supports the front axle shaft 21F to which the front wheels 7F are attached.

The first clutch 17 and the second clutch 18 are hydraulic clutches or the like. A fluid passage connected to the first clutch 17 is connected to a first actuation valve 25 which is supplied with hydraulic fluid delivered from a hydraulic pump 33. The first clutch 17 is switched between a clutch-on state and a clutch-off state depending on the opening degree of the first actuation valve 25. A fluid passage connected to the second clutch 18 is connected to a second actuation valve 26. The second clutch 18 is switched between a clutch-on state and a clutch-off state depending on the opening degree of the second actuation valve 26. The first actuation valve 25 and the second actuation valve 26 are, for example, solenoid two-position changeover valves having solenoids each of which is excited and unexcited to switch the corresponding first or second actuation valve 25 or 26 between the clutch-on state and the clutch-off state.

When the first clutch 17 is in the clutch-off state and the second clutch 18 is in the clutch-on state, power of the shuttle shaft 12 is transmitted via the second clutch 18 to the front wheels 7F. This makes a four-wheel drive (4WD) mode in which the front wheels 7F and the rear wheels 7R are driven by the driving power, and the rotation speeds of the front wheels 7F and the rear wheels 7R are substantially equal to each other (an equal-speed 4WD state). On the other hand, when the first clutch 17 is in the clutch-on state and the second clutch 18 is in the clutch-off state, the vehicle is set in a four-wheel drive mode in which the rotation speed of the front wheels 7F becomes faster than the rotation speed of the rear wheels 7R (an acceleration 4WD state). Also, when the first clutch 17 and the second clutch 18 are in the clutch-off state, power of the shuttle shaft 12 is not transmitted to the front wheels 7F, and thus the vehicle is set in a two-wheel drive (2WD) mode in which only the rear wheels 7R are driven by the driving power.

The tractor 1 includes a positioning device 40. The positioning device 40 is capable of detecting its own position (positioning information including latitude and longitude) with a satellite positioning system (positioning satellite) such as D-GPS, GPS, GLONASS, HOKUTO, GALILEO, and MICHIBIKI. That is, the positioning device 40 receives a satellite signal transmitted from the positioning satellite (such as the position of the positioning satellite, transmission time, and correction information), and detects the position (for example, latitude and longitude) based on the satellite signal. The positioning device 40 has a receiver 41 and an inertial measurement unit (IMU: Inertial Measurement Unit) 42. The receiver 41 is a device having an antenna or the like to receive satellite signals transmitted from the positioning satellite, and is attached to the vehicle body 3 separately from the inertial measurement unit 42. In this preferred embodiment, the receiver 41 is disposed above the roof of the cabin via a supporting member. Note that the attachment location of the receiver 41 is not limited by the preferred embodiment.

The inertial measurement unit 42 has an acceleration sensor to detect acceleration, a gyro sensor to detect angular velocity, and so forth. The vehicle body 3 is provided, for example, below the operator's seat 10 or the like. By the inertial measurement unit 42, the roll angle, pitch angle, yaw angle, and so forth of the vehicle body 3 can be detected.

As depicted in FIG. 1, the tractor 1 includes a steering device 11. The steering device 11 is a device capable of performing manual steering of the vehicle body 3 with steering operation by the operator and automatic steering of the vehicle body 3 without steering operation by the operator.

The steering device 11 has the steering wheel 30 and a steering shaft (rotation shaft) 31 rotatably supporting the steering wheel 30. Also, the steering device 11 has an assist mechanism (power steering device) 32. The assist mechanism 32 assists the rotation of the steering shaft 31 (steering wheel 30) with hydraulic pressure or the like. The assist mechanism 32 includes the hydraulic pump 33, a control valve 34 to which a hydraulic fluid delivered from the hydraulic pump 33 is supplied, and a steering cylinder 35 which is actuated by the control valve 34. The control valve 34 is, for example, a three-position changeover valve that is switchable with the movement of a spool or the like, and is switched in accordance with the steering direction (rotating direction) of the steering shaft 31. The steering cylinder 35 is connected to an arm (knuckle arm) for changing the orientation of the front wheels 7F.

Therefore, when the operator holds and operates the steering wheel 30 in one direction or the other direction, the switching position and the opening degree of the control valve 34 are switched in accordance with the rotating direction of the steering wheel 30 and, with the steering cylinder 35 extending or contracting to left or right in accordance with the switching position and the opening degree of the control valve 34, the steering direction of the front wheels 7F can be changed. That is, in the vehicle body 3, the forwarding direction can be changed to left or right by manual steering of the steering wheel 30.

Figure 2:
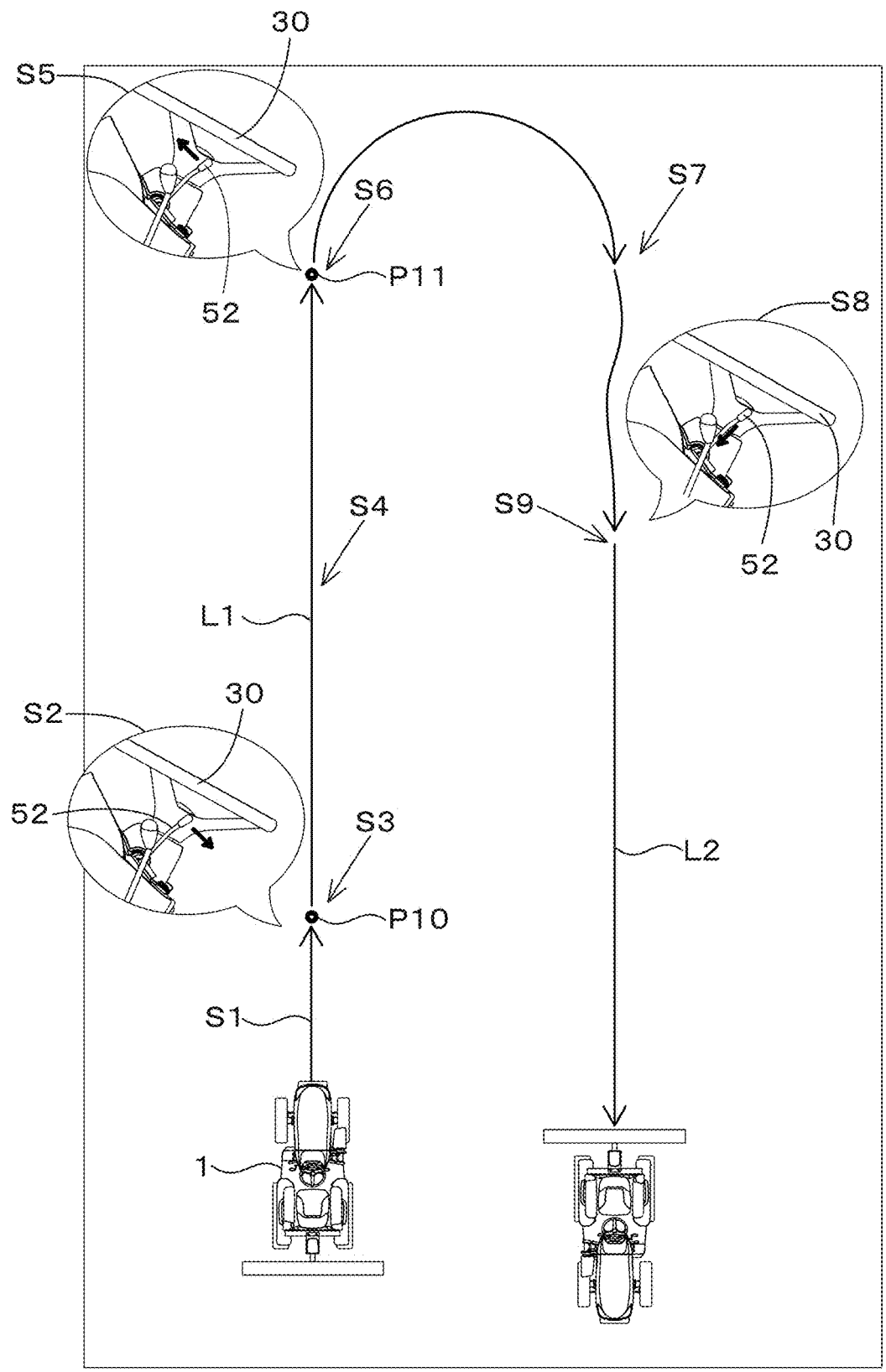
FIG. 2 is a descriptive diagram for describing automatic steering.

As depicted in FIG. 2, to perform automatic steering, a traveling reference line L1 is first set. After the traveling reference line L1 is set, a scheduled traveling line L2 parallel to the traveling reference line L1 is set, thereby allowing automatic steering to be performed. In automatic steering, steering of the tractor 1 (vehicle body 3) in the forwarding direction is automatically performed so that the vehicle-body position measured by the positioning device 40 matches the scheduled traveling line L2.

Specifically, before performing automatic steering, the tractor 1 (vehicle body 3) is moved to a predetermined position in an agricultural field (S1), and the operator operates a steering changeover switch (registration switch) 52 provided in the tractor 1 at a predetermined position (S2). Accordingly, the vehicle-body position measured by the positioning device 40 is set as a start point P10 of the traveling reference line L1 (S3). Further, the tractor 1 (vehicle body 3) is moved from the start point P10 of the traveling reference line L1 (S4), and the operator operates the steering changeover switch (registration switch) 52 at a predetermined position (S5). Accordingly, the vehicle-body position measured by the positioning device 40 is set as an end point P11 of the traveling reference line L1 (S6). Therefore, a straight line connecting the start point P10 and the end point P11 is set as the traveling reference line L1.

After the traveling reference line L1 is set (after S6), for example, the tractor 1 (vehicle body 3) is moved to a location different from the location where the traveling reference line L1 is set (S7), and the operator operates the steering changeover switch 52 (S8). Accordingly, the scheduled traveling line L2 is set, which is a straight line parallel to the traveling reference line L1 (S9). After the scheduled traveling line L2 is set, automatic steering is started, and the forwarding direction of the tractor 1 (vehicle body 3) varies along the scheduled traveling line L2. For example, the front wheels 7F are steered to right when the current vehicle-body position is on the left side with respect to the scheduled traveling line L2, and the front wheels 7F are steered to left when the current vehicle-body position is on the right side with respect to the scheduled traveling line L2. Note that during automatic steering, the traveling speed (vehicle speed) of the tractor 1 (vehicle body 3) can be changed by the operator who manually changes the operation amount of an accelerator (accelerator pedal, accelerator lever) 210 or changes the speed stage of the transmission 5 with a speed-shift member (speed-shift lever, speed-shift switch) 211.

Also, after the automatic steering starts, the operator can terminate the automatic steering by operating the steering changeover switch at any location. That is, the end point of the scheduled traveling line L2 can be set by terminating the automatic steering with operation of the steering changeover switch 52. That is, the length from the start point to the end point of the scheduled traveling line L2 can be set longer or shorter than the traveling reference line L1. In other words, the scheduled traveling line L2 is not associated with the length of the traveling reference line L1, and the scheduled traveling line L2 allows traveling to a distance longer than the length of the traveling reference line L1 during performing the automatic steering.

As depicted in FIG. 1, the steering device 11 has an automatic steering mechanism 37. The automatic steering mechanism 37 is a mechanism for automatic steering of the vehicle body 3 based on the position of the vehicle body 3 (vehicle-body position) detected by the positioning device 40. The automatic steering mechanism 37 includes a steering motor 38 and a gear mechanism 39. The steering motor 38 is a motor capable of controlling the rotating direction, rotation speed and rotation angle, and so forth based on the vehicle-body position. The gear mechanism 39 includes a gear provided on the steering shaft 31 to rotate with the steering shaft 31 and a gear provided on the rotation shaft of the steering motor 38 to rotate with the rotation shaft. When the rotation shaft of the steering motor 38 rotates, the steering shaft 31 automatically rotates (revolves) via the gear mechanism 39 to allow the front wheels 7F to be steered to change their direction so that the vehicle-body position matches the scheduled traveling line L2.

As depicted in FIG. 1, the tractor 1 includes a setting switch 51. The setting switch 51 is a switch switchable to at least a setting mode in which setting is allowed to be performed before starting automatic steering. In the setting mode before starting automatic steering, various settings relating to the automatic steering, and, for example, a start point and end point of the traveling reference line L1, and so forth can be performed.

The setting switch 51 can be turned on and off. The setting switch 51, when turned on, outputs a signal indicating that the setting mode is enabled and the setting switch 51, when turned off, outputs a signal indicating that the setting mode is disabled. Also, the setting switch 51, when turned on, outputs, to the display 45, a signal indicating that the setting mode is enabled, and the setting switch 51, when turned off, outputs to the display 45 a signal indicating that the setting mode is disabled.

The tractor 1 includes the steering changeover switch 52. The steering changeover switch 52 is a switch switchable between a state for start of automatic steering and a state for termination of automatic steering. Specifically, the steering changeover switch 52 is shiftable upward, downward, forward, and rearward from a neutral position. In a state where the setting mode is enabled, the steering changeover switch 52, when shifted downward from the neutral position, outputs a signal for start of automatic steering. In the state where the setting mode is disabled, the steering changeover switch 52, when shifted upward from the neutral position, outputs a signal for termination of automatic steering. Also, in the state where the setting mode is enabled, the steering changeover switch 52, when shifted rearward from the neutral position, outputs setting of the start point P10 of the traveling reference line L1. In the state where the setting mode is enabled, the steering changeover switch 52, when shifted forward from the neutral position, outputs setting of the end point P11 of the traveling reference line L1. That is, the steering changeover switch 52 serves as a registration switch for setting a start position (start point P10) and an end position (end point P11) of the traveling reference line L1 and a switch for selecting either start or termination of automatic switching.

As depicted in FIG. 1, the tractor 1 includes a plurality of controllers 60. The plurality of controllers 60 are devices to perform control over a traveling system, control over a working system, calculation of the vehicle-body position, and so forth in the tractor 1. The plurality of controllers 60 are a first controller 60A, a second controller 60B, and a third controller 60C.

The first controller 60A receives a satellite signal (reception information) received by the receiver 41 and measurement information (acceleration and angular velocity) obtained by measurement by the inertial measurement device 42, and finds the vehicle-body position based on the received information and the measurement information.

Also, the first controller 60A has a reference registration controller 150. The reference registration controller 150 is configured of an electric and electronic circuit provided in the first controller 60A, a program stored in a CPU or the like, or so forth. As described above, the reference registration controller 150 registers the traveling reference line L1, that is, sets the start point P10 and the end point P11. In a situation where the tractor 1 is caused to travel by manual steering while the setting mode is set, the reference registration controller 150 sets the vehicle-body position as the start point P10 of the traveling reference line L1 by operating the steering changeover switch 52 to a start-point setting side, and the reference registration controller 150 sets the vehicle-body position as the end point P11 of the traveling reference line L1 by operating the steering changeover switch 52 to an end-point setting side.

The second controller 60B has an automatic steering controller 200. The automatic steering controller 200 is configured of an electric and electronic circuit provided in the second controller 60B, a program stored in a CPU or the like, or so forth. The automatic steering controller 200 controls the steering motor 38 of the automatic steering mechanism 37 so that the vehicle body 3 travels along the scheduled traveling line L2.

Figure 3:
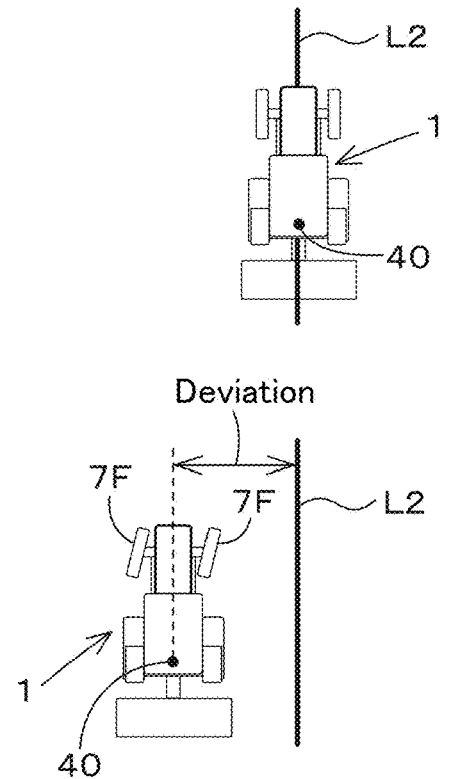
FIG. 3 is a descriptive diagram for describing the operation of automatic steering.
Figure 3:
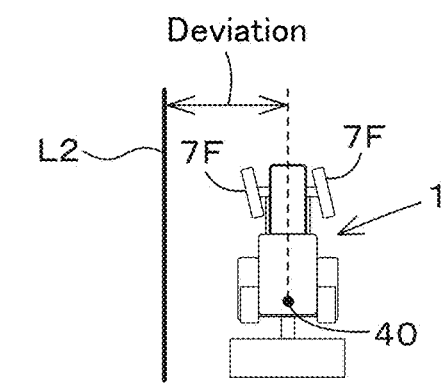
Figure 3:
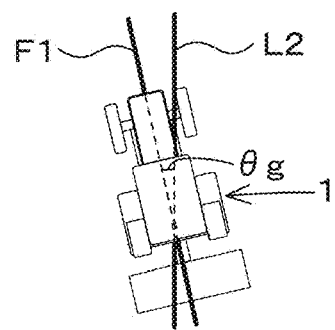

As depicted in FIG. 3, when the steering changeover switch 52 is operated to an automatic steering start side, the automatic steering controller 200 causes automatic steering of the tractor 1 (vehicle body 3) based on the scheduled traveling line L2 parallel to the traveling reference line L1. When a deviation between the vehicle-body position and the scheduled traveling line L2 is equal to or smaller than a threshold value, the automatic steering controller 200 keeps the rotation angle of the rotation shaft of the steering motor 38. When the deviation (positional deviation) between the vehicle-body position and the scheduled traveling line L2 is equal to or larger than the threshold value and the tractor 1 is positioned on the left side with respect to the scheduled traveling line L2, the automatic steering controller 200 rotates the rotation shaft of the steering motor 38 so that the tractor 1 is steered rightward. That is, the automatic steering controller 200 sets a steering angle in the right direction so that the positional deviation becomes zero. When the deviation between the vehicle-body position and the scheduled traveling line L2 is equal to or larger than the threshold value and the tractor 1 is positioned on the right side with respect to the scheduled traveling line L2, the automatic steering controller 200 rotates the rotation shaft of the steering motor 38 so that the tractor 1 is steered leftward. That is, the automatic steering controller 200 sets a steering angle in the left direction so that the positional deviation becomes zero.

In the above-described preferred embodiment, the steering angle of the steering device 11 is changed based on the deviation between the vehicle-body position and the scheduled traveling line L2. Alternatively, when the azimuth of the scheduled traveling line L2 and an azimuth (vehicle-body azimuth) F1 of the tractor 1 (vehicle body 3) in the forwarding direction (traveling direction) are different, that is, when an angle θg of the vehicle-body azimuth F1 with respect to the scheduled traveling line L2 is equal to or larger than a threshold value, the automatic steering controller 200 may set a steering angle so that the angle θg becomes zero (the vehicle-body azimuth F1 matches the azimuth of the scheduled traveling line L2). Also, the automatic steering controller 200 may set a final steering angle in automatic steering based on the steering angle found based on the deviation (positional deviation) and a steering angle found based on the azimuth (azimuth deviation). Setting of the steering angle in automatic steering in the above-described preferred embodiment is one example and is not meant to be restrictive. Note that the azimuth (vehicle-body azimuth) F1 of the vehicle body 3 can be found by the positioning device 40.

Also, when the accelerator 210 is operated during automatic steering being performed by the automatic steering controller 200, the second controller 60B changes the rotation speed of the prime mover 4 (prime mover rotation speed) in accordance with the operation amount of the accelerator 210. Also, when the speed-shift member 211 is operated during automatic steering being performed by the automatic steering controller 200, the second controller 60B changes the speed-shifting stage of the transmission 5.

The third controller 60C causes the coupling portion 8 to be lifted up and down in accordance with the operation of an operating member provided on the periphery of the operator's seat 10. Note that the first controller 60A, the second controller 60B, and the third controller 60C may be integrated. Also, the above-described control over the traveling system, control over the working system, and calculation of the vehicle-body position are not meant to be restrictive. As described above, by the controllers 60, the tractor 1 (vehicle body 3) can be automatically steered.

As depicted in FIG. 1, the tractor 1 includes the display 45. The display 45 is a device capable of displaying various information regarding the tractor 1 and capable of displaying at least operation information of the tractor 1. The display 45 is provided forward of the operator's seat 10.

The display 45 includes a controller (display controller) 46 and a screen 47. The controller 46 performs various controls regarding screen display of the display 45 and so forth. The controller 46 is configured of an electric and electronic circuit provided in the display 45, a program stored in a CPU or the like, or so forth. The screen 47 is configured of a liquid-crystal panel or the like to display various information in accordance with control by the controller 46. Note that description is hereinafter made by assuming that the controller 46 controls the screen and so forth of the display 45.

Figure 4:
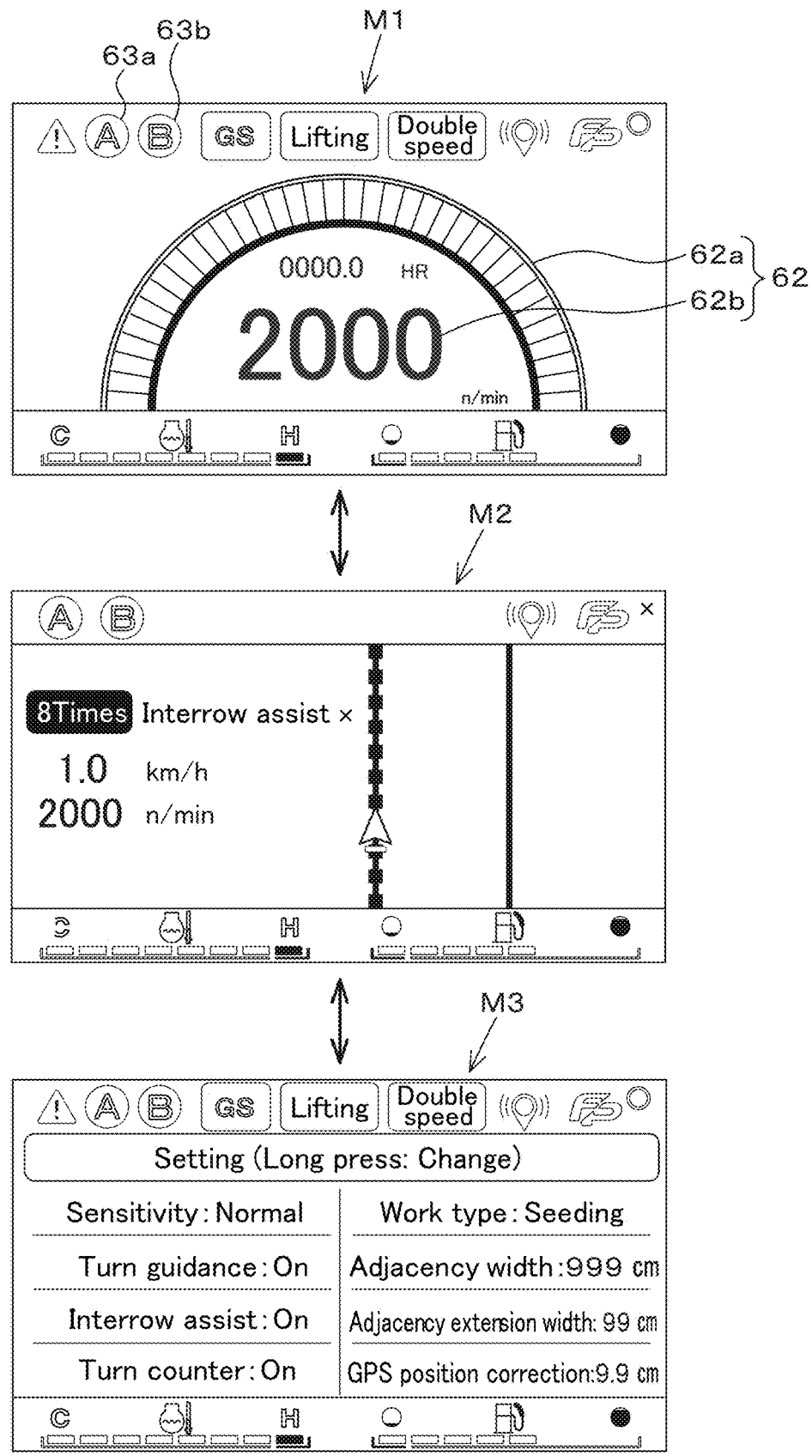
FIG. 4 is a diagram depicting one example of an operation screen M1, a guidance screen M2, and a setting screen M3.

As depicted in FIG. 4, when a predetermined operation is performed, the display 45 (controller 46) displays an operation screen M1, a guidance screen M2, and a plurality of setting screens M3.

The operation screen M1 includes a rotation indicating graphic 62 for displaying the rotation speed of the prime mover 4 (prime mover rotation speed). The rotation indicating graphic 62 includes a level indicating graphic 62a which displays the prime mover rotation speed with a bar or the like and a numerical indicating graphic 62b which indicates the prime mover rotation speed by numbers. If setting of the traveling reference line L1 has been completed, the operation screen M1 displays a symbol mark 63a indicating that setting of the start point P10 of the traveling reference line L1 has been completed and a symbol mark 63b indicating that setting of the end point P11 of the traveling reference line L1 has been completed.

Figure 5:
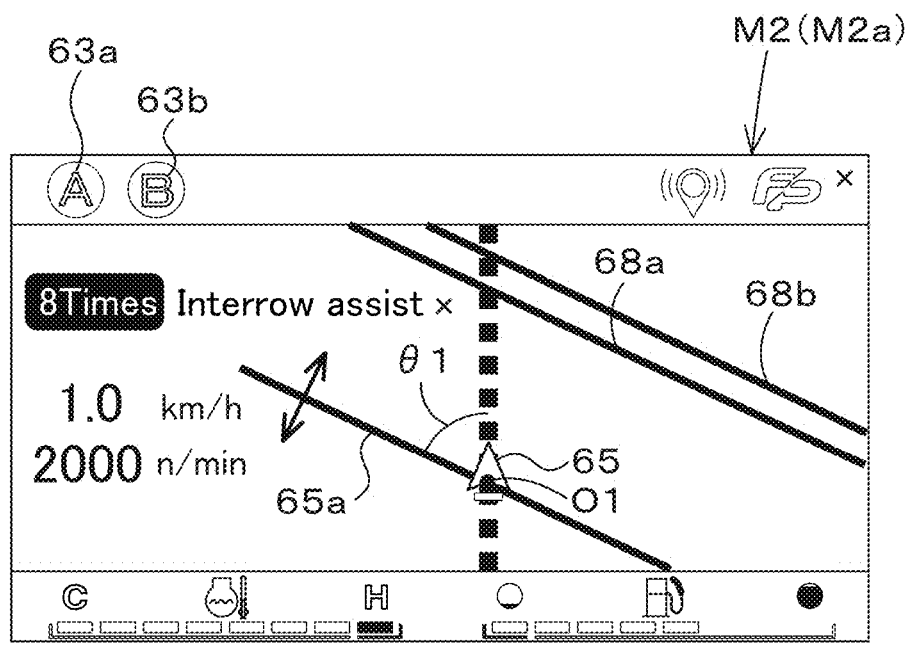
FIG. 5 is a diagram depicting one example of a turn guidance screen M2a and an interrow guidance screen M2b.
Figure 5:
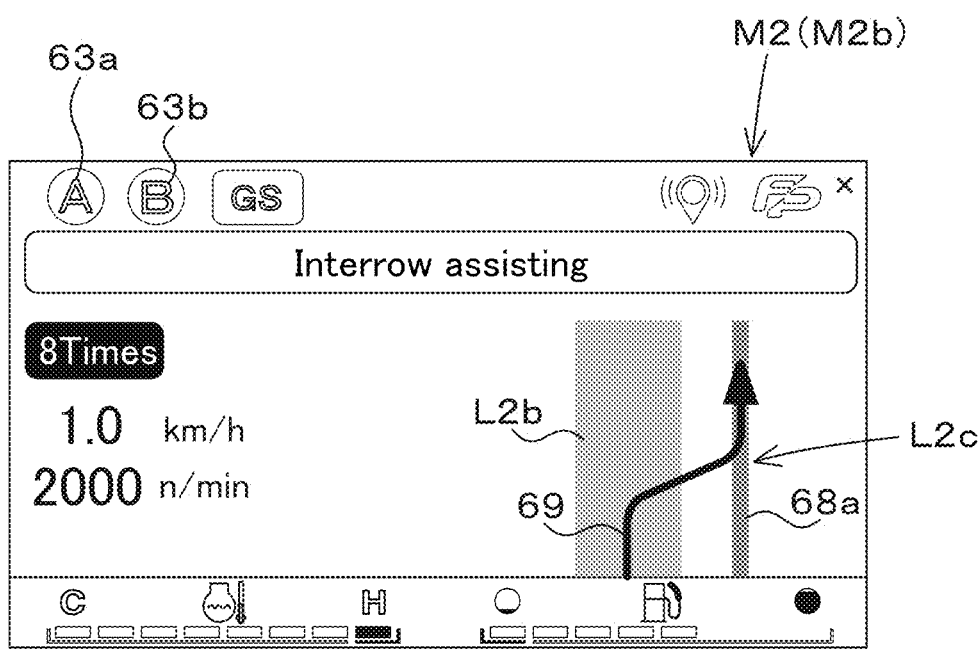
Figure 6A:
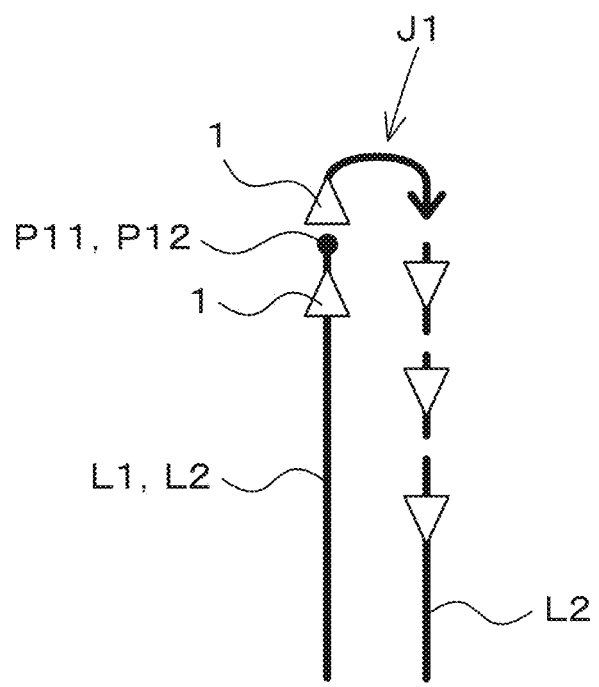
FIG. 6A is a schematic diagram briefly depicting turn traveling J1 from straight-forward traveling.
Figure 6B:
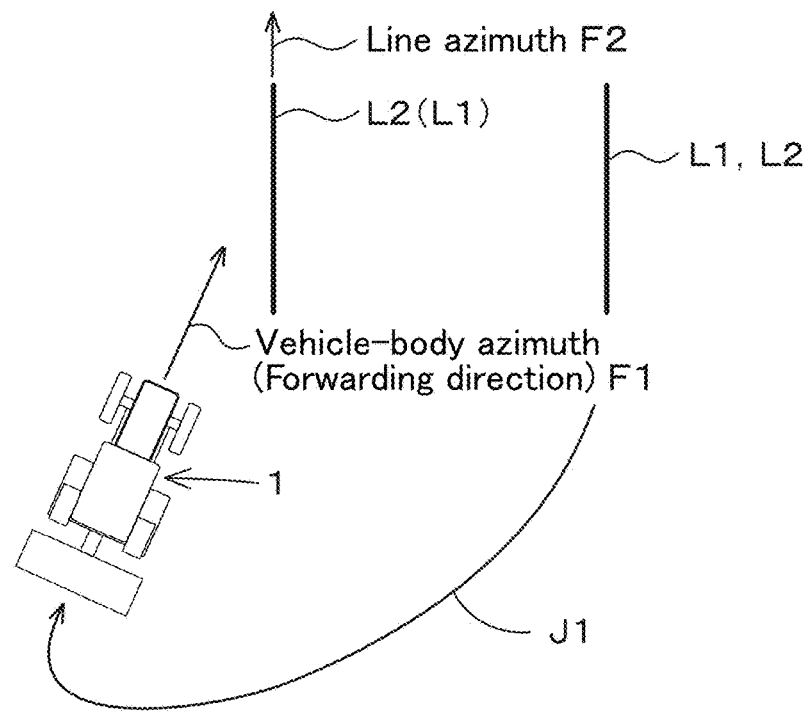
FIG. 6B is a diagram depicting a state in which an azimuth (vehicle-body azimuth) F1 of a forwarding direction and an azimuth (line azimuth) F2 of a traveling reference line L1 are different.
Figure 6B:
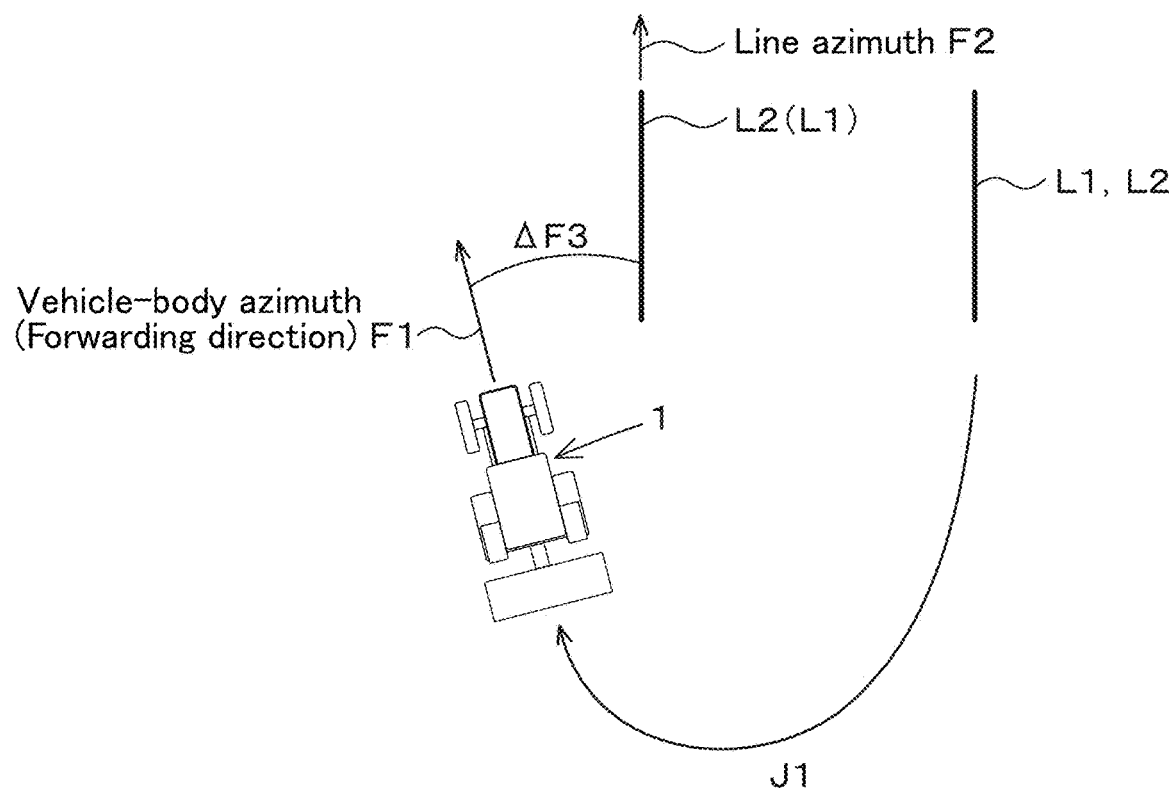

As depicted in FIG. 5, the guidance screen M2 includes a turn guidance screen M2a and an interrow guidance screen M2b. As depicted in FIG. 6A, after setting the end point P11 of the traveling reference line L1 or after the termination of automatic steering at a point P12, to start automatic steering, it is required to satisfy a condition for automatic steering after performing turn-traveling J1 of the tractor 1 with manual operation or the like. For example, as depicted in FIG. 6B, after turning of the tractor 1 and before automatic steering, if an azimuth difference ΔF3, which is a difference between an azimuth (vehicle-body azimuth) F1 of the tractor 1 in the forwarding direction and an azimuth (line azimuth) F2 of the traveling reference line L1 (scheduled traveling line L2) becomes greatly large, it is difficult to steer the tractor 1 along the scheduled traveling line L2 parallel to the traveling reference line L1 even if automatic steering starts. Note that the azimuth (line azimuth) F2 of the traveling reference line L1 (scheduled traveling line L2) matches a direction in which the line extends, and may be in a direction of the line from one end to the other end or in a direction of the line from the other end to one end. In other words, matching of the vehicle-body azimuth F1 and the line azimuth F2 (with no azimuth difference ΔF3) means a state in which the forwarding direction of the tractor 1 matches the direction in which the traveling reference line L1 (scheduled traveling line L2) extends.

Figure 7A:
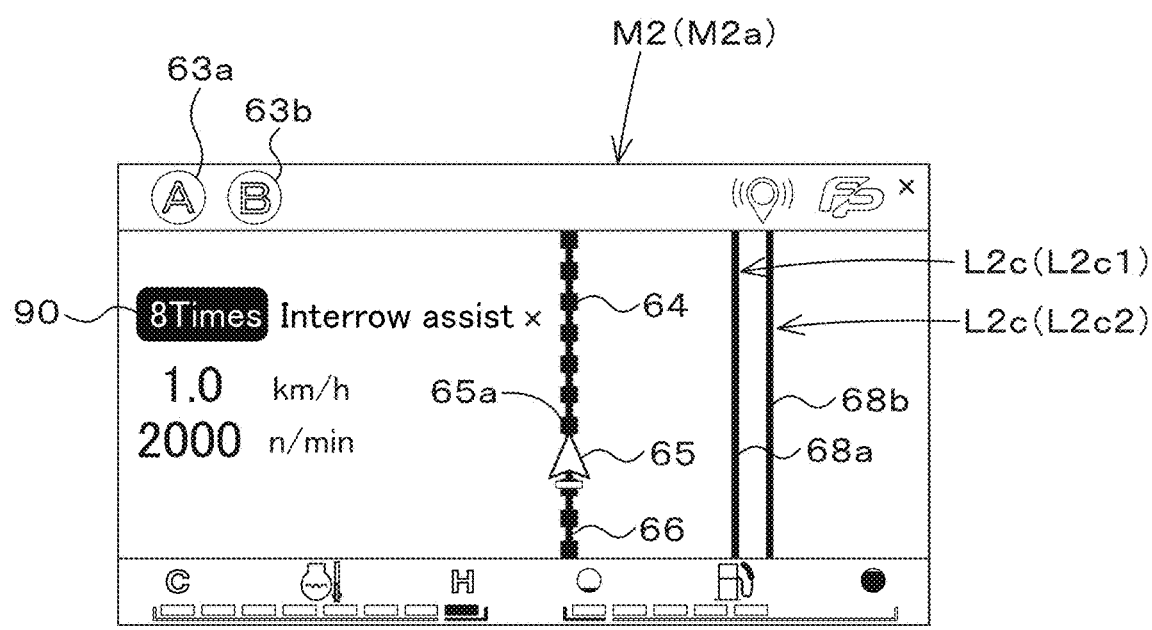
FIG. 7A is a diagram depicting one example of the turn guidance screen M2a when an azimuth difference ΔF3 indicates matching.
Figure 7B:
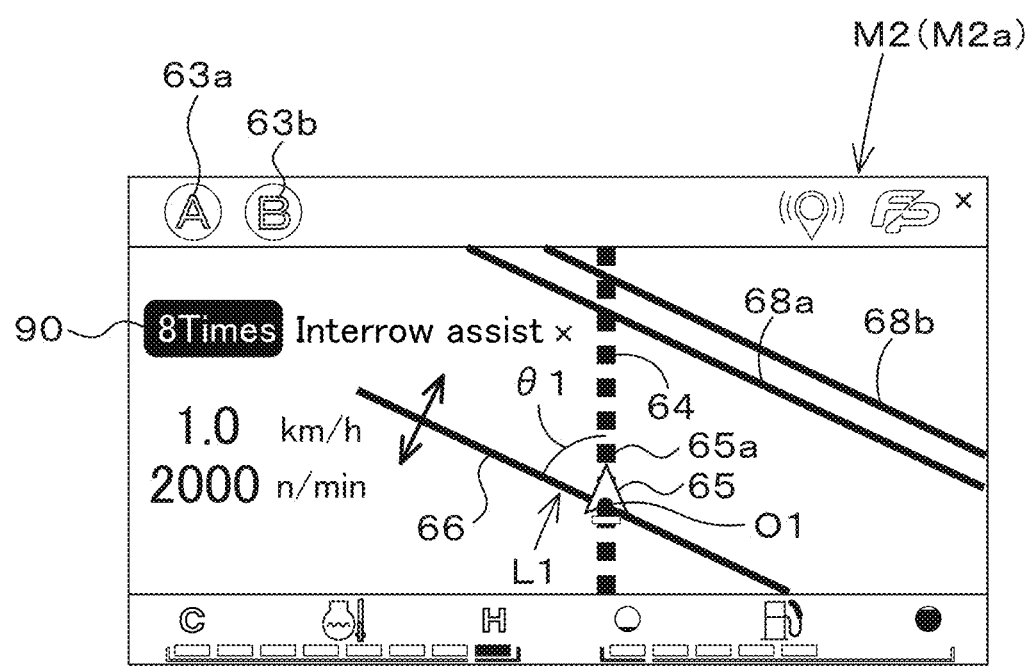
FIG. 7B is a diagram depicting one example of the turn guidance screen M2a when the azimuth difference ΔF3 indicates a difference.
Figure 7C:
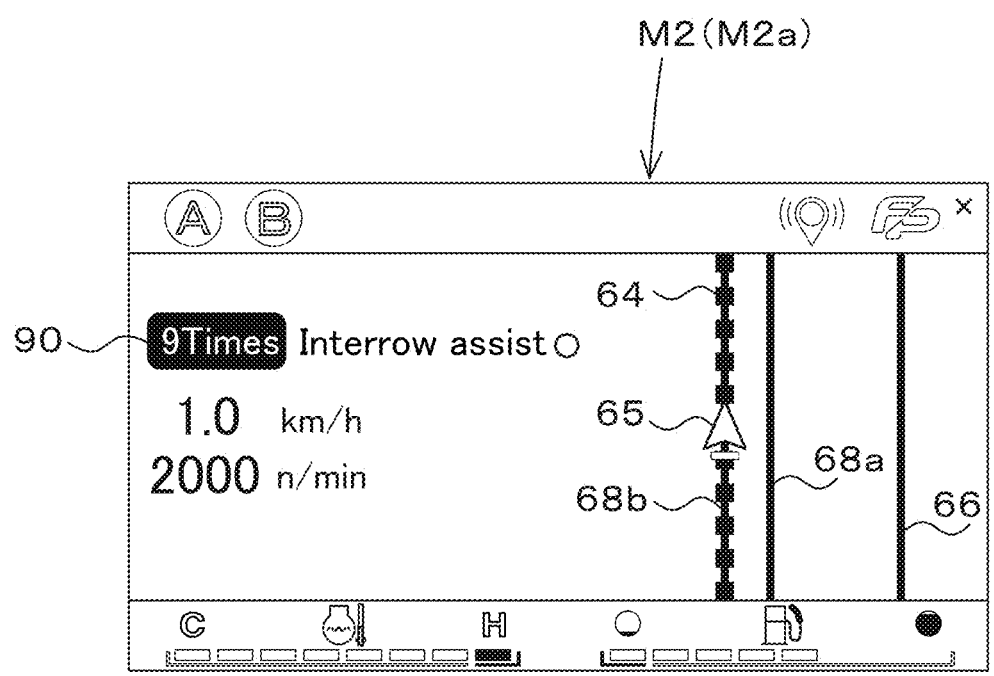
FIG. 7C is a diagram depicting one example of the turn guidance screen M2a when the azimuth difference ΔF3 is within a threshold value after turning.

Thus, as depicted in FIGS. 7A to 7C, the turn guidance screen M2a displays the azimuth difference ΔF3, which is a condition for a start of automatic steering. The operator can grasp that the condition for automatic steering is satisfied when the small azimuth difference ΔF3 is displayed on the turn guidance screen M2a.

The turn guidance screen M2a is described by using FIGS. 7A to 7C. In the following description, the current scheduled traveling line L2 on which the tractor 1 (vehicle body 3) is traveling or the scheduled traveling line L2 immediately before the tractor 1 (vehicle body 3) terminates automatic steering may be represented as a "scheduled traveling line L2b" and the next-scheduled traveling line L2 after next automatic steering may be represented as a "scheduled traveling line L2c".

The turn guidance screen M2a includes a vehicle-body azimuth indicating graphic 64, a vehicle-body indicating graphic 65, and a reference azimuth indicating graphic 66. Note that for convenience of description, the vehicle-body azimuth indicating graphic 64 is indicated by a dotted line.

The vehicle-body azimuth indicating graphic 64 is an image indicating the vehicle-body azimuth F1, and is indicated by a straight line (straight line vertically extending on the turn guidance screen M2a) on the turn guidance screen M2a. The display position of the vehicle-body azimuth indicating graphic 64 is fixed on the turn guidance screen M2a and the position is not changed. The vehicle-body indicating graphic 65 is an image graphically indicating the vehicle body 3 and superposed on the vehicle-body azimuth indicating graphic 64. The vehicle-body indicating graphic 65 has a polygonal shape including a tip portion 65a with a pointed tip, and the tip portion 65a indicates a front portion of the tractor 1 (vehicle body 3).

The reference azimuth indicating graphic 66 is a portion indicating the azimuth F2 of the traveling reference line L1 (next-scheduled traveling line L2), and is indicated by a straight line on the turn guidance screen M2a. As depicted in FIG. 7A, when the vehicle-body azimuth F1 matches the line azimuth F2, the vehicle-body azimuth indicating graphic 64 and the reference azimuth indicating graphic 66 are displayed as superposed. Since the vehicle-body azimuth indicating graphic 64 and the reference azimuth indicating graphic 66 are differently colored, the operator and any other person can visually recognize that the vehicle-body azimuth F1 matches the line azimuth F2.

As depicted in FIG. 7B, when the turn-traveling J1 of the tractor 1 (vehicle body 3) causes increase of the azimuth difference ΔF3 between the vehicle-body azimuth F1 and the next line azimuth F2, the controller 46 changes the display position of the linear reference azimuth indicating graphic 66 in accordance with the azimuth difference ΔF3. Specifically, when the vehicle-body indicating graphic 65 is taken as a center O1, the reference azimuth indicating graphic 66 revolves about the center O1 of the vehicle-body indicating graphic in accordance with the magnitude of the azimuth difference ΔF3. The display 45 (controller 46) increases an angle θ1 between the reference azimuth indicating graphic 66 and the vehicle-body indicating graphic 65 according to increase of the azimuth difference ΔF3, and decreases the angle θ1 between the reference azimuth indicating graphic 66 and the vehicle-body indicating graphic 65 according to decrease of the azimuth difference ΔF3. As depicted in FIG. 7C, when a next line indicating graphic 68a or 68b and the vehicle-body indicating graphic 65 superpose each other, this indicates that the condition for automatic steering is satisfied. In other words, when the azimuth difference ΔF3 becomes equal to or smaller than a predetermined value, the condition for automatic steering is satisfied.

Also, the turn guidance screen M2a displays the next line indicating graphics 68a and 68b. The next line indicating graphic 68b is displayed when an adjacency width is changed as described further below. The next line indicating graphic 68a is an image indicating at least a next scheduled traveling line L2c as one next to the scheduled traveling line L2b on which the tractor 1 (vehicle body 3) has traveled, and indicates a straight-forwarding region on which the tractor 1 (vehicle body 3) forwards straight while using automatic steering. The line indicating graphic (straight-forwarding region) 68a is indicated at a position having a predetermined distance from the vehicle-body azimuth indicating graphic 64 on the turn guidance screen M2a.

As depicted in FIG. 5, the interrow guidance screen M2b is a screen indicating that, while the condition for automatic steering is satisfied, the tractor 1 (vehicle body 3) is being guided toward the next scheduled traveling line L2c by automatic steering separately from the automatic steering controller 200. The interrow guidance screen M2b includes the next line indicating graphic 68a and a guide indicating graphic 69 indicating that the tractor 1 (vehicle body 3) is being guided to the next line indicating graphic 68a by automatic steering (an interrow assist is being performed).

As depicted in FIG. 8 to FIG. 10C, the plurality of setting screens M3 include a home setting screen M3a and a detail setting screen M3b. For the home setting screen M3a and the detail setting screen M3b, setting information is information relating to the vehicle body 3, that is, information relating to automatic steering.

Figure 8:
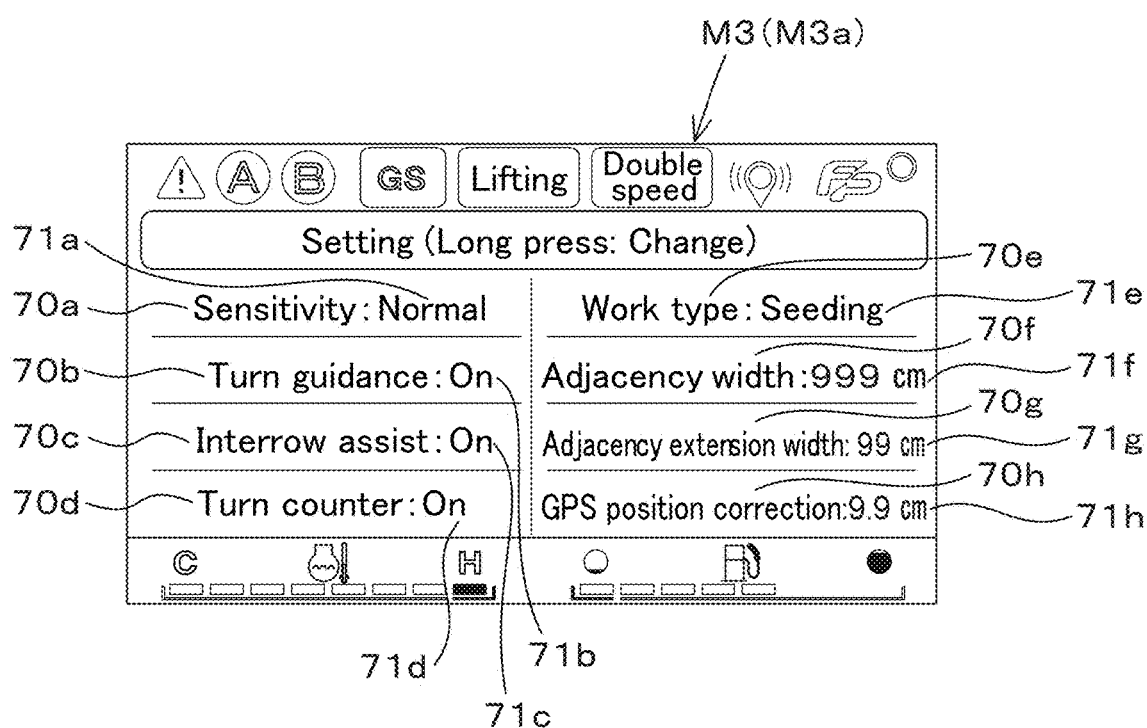

As depicted in FIG. 8, the home setting screen M3a displays setting items 70a to 70h and set values 71a to 71h.

The setting item 70a is an item indicating sensitivity of automatic steering as the set value 71a, and sensitivity can be set at any of three set values: sensitive, normal, and insensitive. When the set value is set as sensitive, the automatic steering is performed with large steering angles in correspondence to deviation (positional deviation, azimuth deviation) during use of automatic steering. When the set value is set as insensitive, the automatic steering is performed with small steering angles in correspondence to deviation (positional deviation, azimuth deviation) during use of automatic steering. When the set value is set as normal, the automatic steering is performed with steering angles that are between steering angles when set as insensitive and steering angles when set as sensitive in correspondence to deviation (positional deviation, azimuth deviation) during use of automatic steering. That is, sensitivity indicates a degree of response to a change in steering angle in correspondence to deviation (positional deviation, azimuth deviation).

The setting item 70b is an item indicating the turn guidance screen M2a (turn guidance), and the set value 71b indicates ON/OFF indicating whether to display the turn guidance screen M2a after automatic steering. When the set value 71b indicates "ON", the turn guidance screen M2a is displayed. When the set value 71b indicates "OFF", the turn guidance screen M2a is not displayed. That is, the set value 71b is to set whether to perform turn guidance with the turn guidance screen M2a. The turn guidance screen M2a becomes hidden at the time of starting automatic steering.

The setting item 70c is an item indicating the interrow guidance screen M2b (interrow assist), and the set value 71c indicates ON/OFF indicating whether to display the interrow guidance screen M2b at the time of starting automatic steering. When the set value 71c indicates "ON", the interrow guidance screen M2b is displayed. When the set value 71c indicates "OFF", the interrow guidance screen M2b is not displayed. That is, the set value 71c is to set whether to perform an interrow assist by automatic steering.

The setting item 70d is an item indicating a count of a number of times of turning by manual steering (turn counter), i.e., the work count that is the number of times of work using automatic steering along with the scheduled traveling line L2, and the set value 71d indicates ON/OFF indicating whether to calculate the work count. When the set value 71d is "ON", the work count is calculated. When the set value 71d is "OFF", the work count is not calculated.

The setting item 70e is an item indicating what kind of work, and the set value 71e is indicated as one selected from farm work names such as cultivation, puddling, ridge plastering, and seeding. The setting item 70f is an item indicating a reference adjacency width L11, and a numerical value of the reference adjacency width L11 is set in the set value 71f as a set value. The setting item 70g is an item indicating a variation adjacency width (adjacent extension width) L12, and the set value 71g is indicated as a numerical value representing the variation adjacency width L12. The setting item 70h is an item indicating position correction (GPS position correction), and the set value 71h is indicated as a numerical value of position correction.

Figure 9:
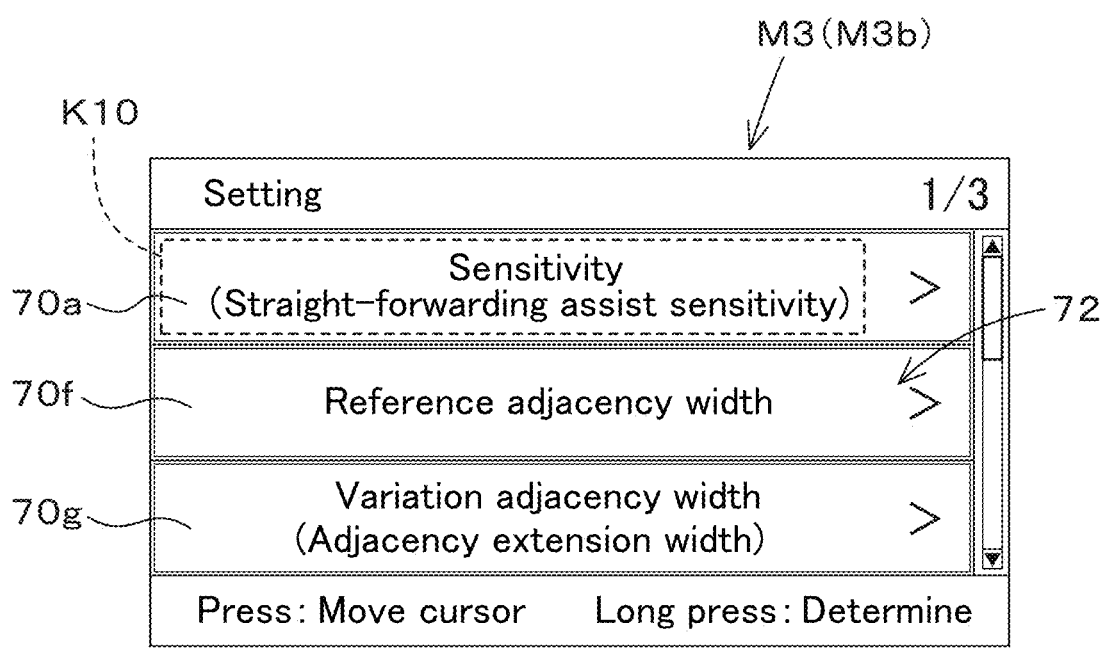
FIG. 9 is a diagram a state in which switching is made from the home setting screen M3a to a detail setting screen M3b.

The detail setting screen M3b is a screen for setting (inputting) and displaying the set values 71a to 71h. When a predetermined operation is performed on the home setting screen M3a, as depicted in FIG. 9, the home setting screen M3a is transited to the detail setting screen M3b. The detail setting screen M3b includes a list display portion 72 for displaying a list of the setting items 70a to 70h, and a cursor K10 is displayed on the list display portion 72.

Figure 10A:
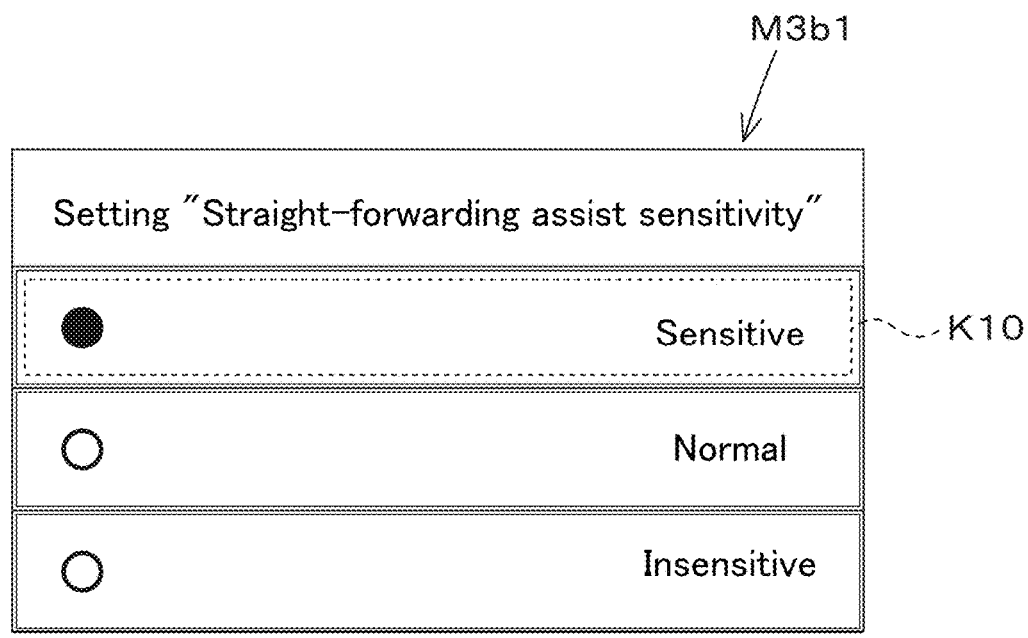
FIG. 10A is a diagram depicting one example of a detail setting screen M3b1.
Figure 10A:
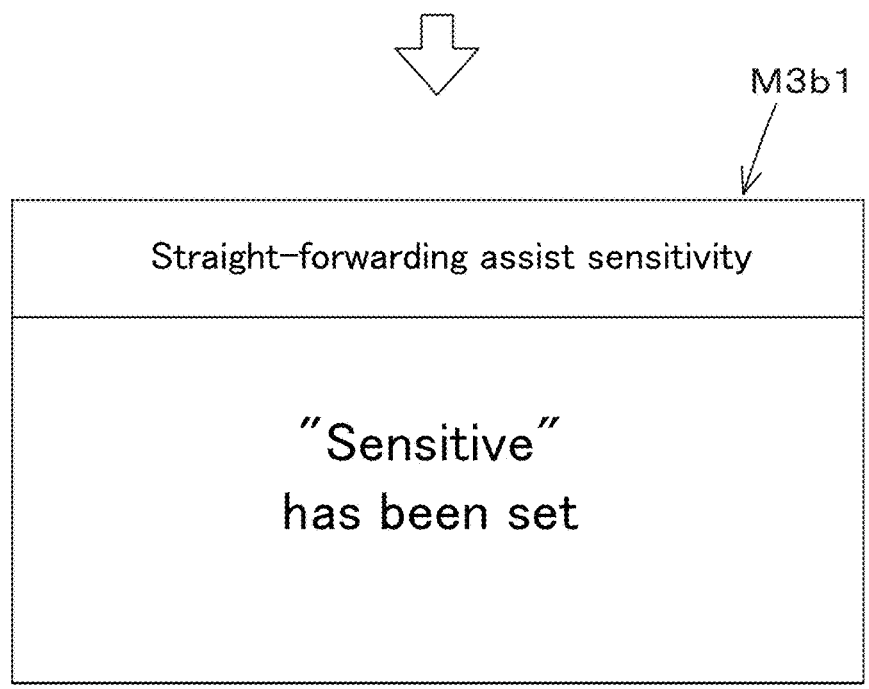

Among the plurality of setting items 70a to 70h, when a predetermined setting item is selected with the cursor K10, the detail setting screen M3b proceeds to a screen for inputting a set value corresponding to the selected setting item. For example, as depicted in FIG. 9, when the setting item 70a indicating sensitivity is selected on the detail setting screen M3b, as depicted in FIG. 10A, the detail setting screen M3b transits to a detail setting screen M3b1 for changing sensitivity. On the detail setting screen M3b1, three set values, i.e., sensitive, normal, and insensitive, are displayed and, by selecting one set value pointed by the cursor K10, the set value can be changed.

Figure 10B:
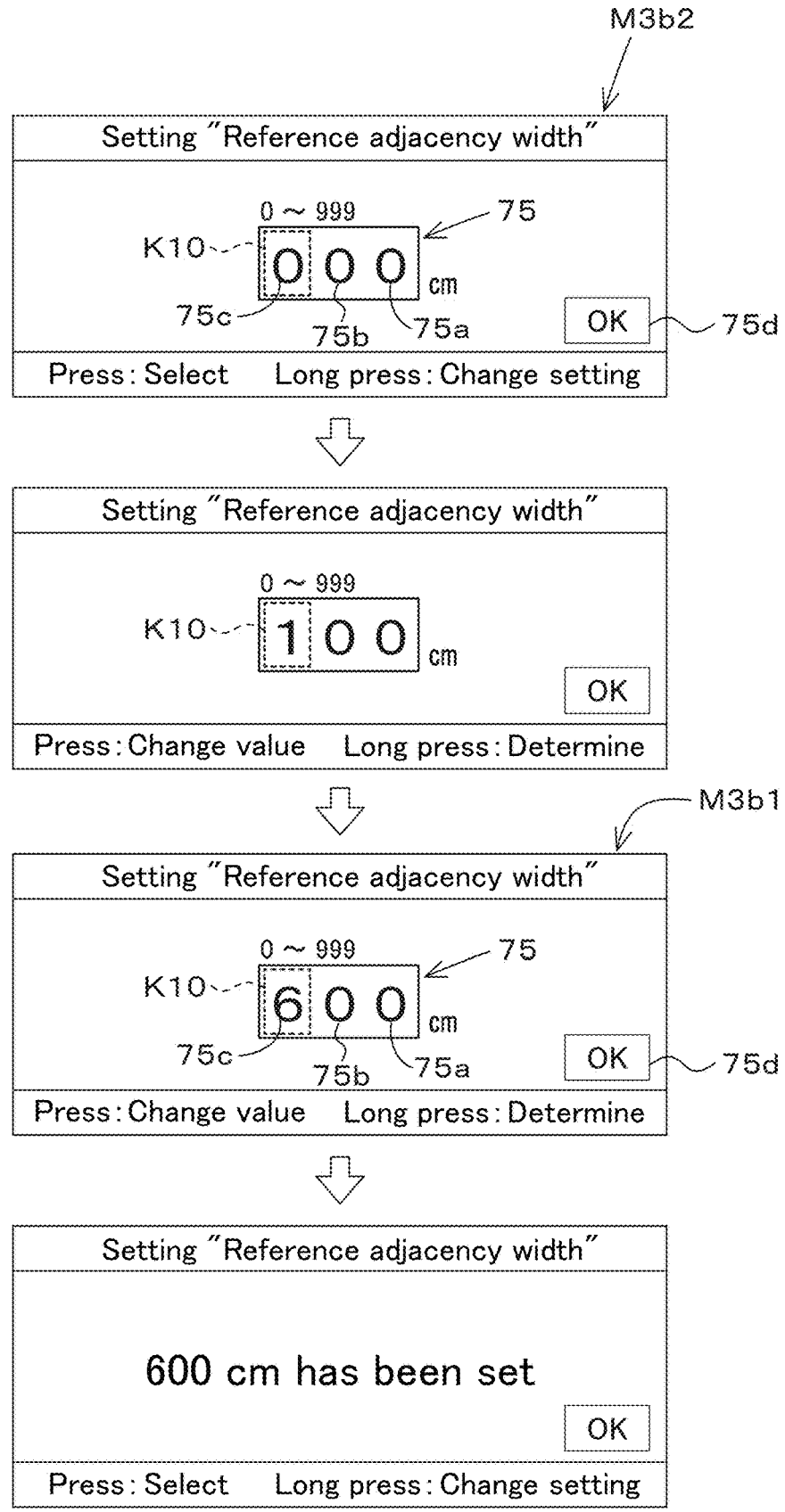
FIG. 10B is a diagram depicting one example of a detail setting screen M3b2.

Also, on the detail setting screen M3b, when the set item 70f indicating the reference adjacency width L11 is selected, as depicted in FIG. 10B, the detail setting screen M3b transits to a detail setting screen M3b2 for changing the reference adjacency width L11. On the detail setting screen M3b2, a reference input portion 75 for inputting the reference adjacency width L11 is displayed. The reference input portion 75 includes a plurality of digit input portions for inputting numerical values corresponding to respective digits, including, for example, a first-digit input portion 75a for inputting a numerical value of the first digit, a second-digit input portion 75b for inputting a numerical value of the second digit, a third-digit input portion 75c for inputting a numerical value of the third digit, and a determination portion 75d for determining a numerical value. Note that while the digit input portions for inputting three-digit numbers are described for the reference input portion 75 in this preferred embodiment, the number of digits is not restrictive.

Also, when the setting item 70g indicating the variation adjacency width (adjacent extension width) L12 is selected on the detail setting screen M3b depicted in FIG. 9, the detail setting screen M3b transits to a detail setting screen M3b3 for adjusting the variation adjacency width L12. On the detail setting screen M3b3, a variation input portion 76 for inputting the variation adjacency width L12 is displayed. The variation input portion 76 is configured of a plurality of digit input portions for inputting numerical values corresponding to respective digits, including, for example, a first-digit input portion 76a for inputting a numerical value of the first digit, a second-digit input portion 76b for inputting a numerical value of the second digit, and a determination portion 75d for determining a numerical value. Note that while the digit input portions for inputting two-digit numbers are described for the variation input portion 76 in this preferred embodiment, the number of digits is not restrictive.

Figure 17:
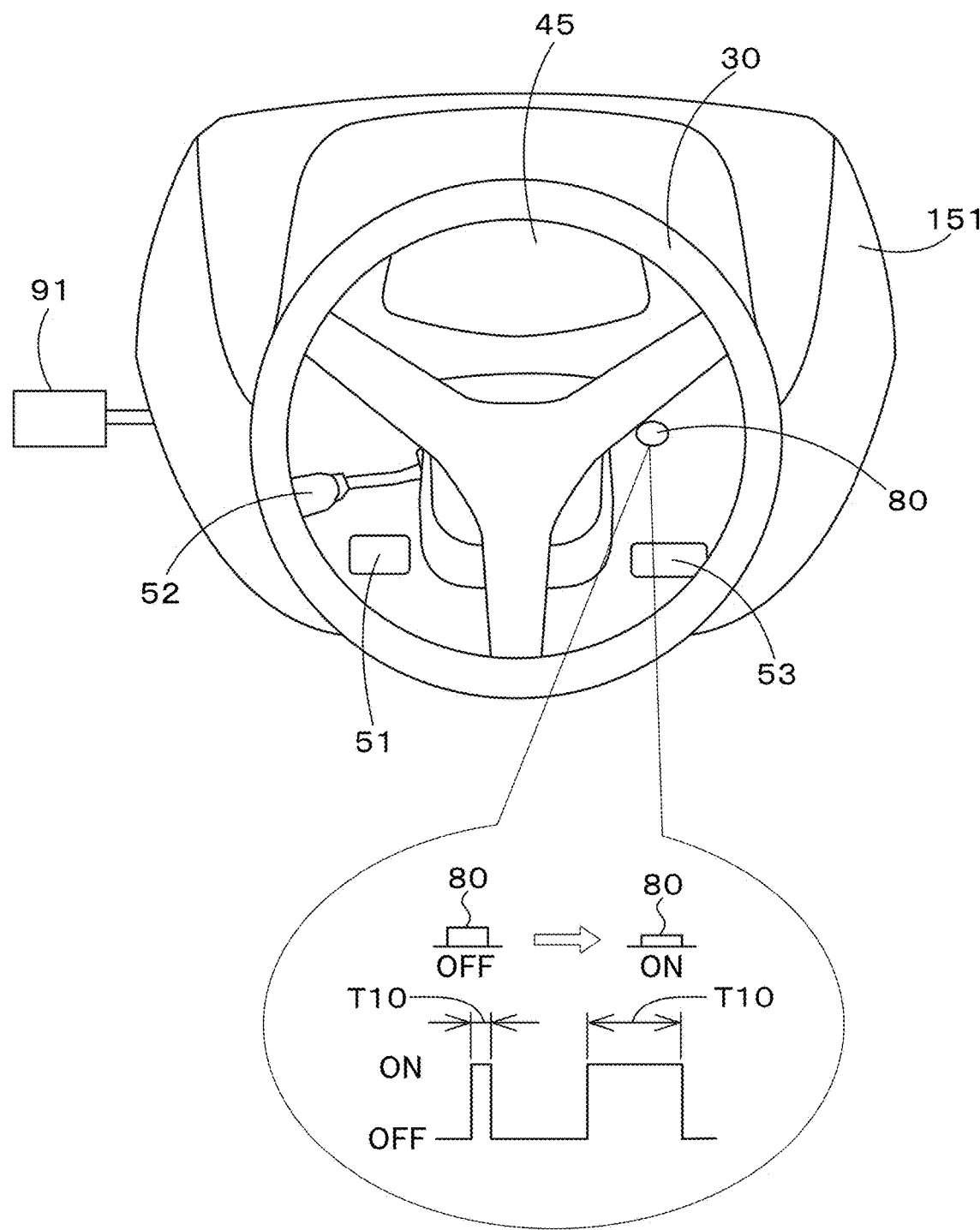
FIG. 17 is a diagram depicting the periphery of the operator's seat.

As depicted in FIG. 1 and FIG. 17, the tractor 1 (vehicle body 3) includes an input button 80. The input button 80 is connected to the display 45 (controller 46). The input button 80 is, for example, an automatic-return-type push button (pressure button) capable of being turned on and off. With a first operation and a second operation, the input button 80 is capable of transiting the screen, moving the cursor K10, and setting a set value in the plurality of setting screens M3.

As depicted in FIG. 17, the input button 80 can perform a short-press operation with a push time (pressurization time, a time for keeping the button turned on) T10 being short as a first operation, and can perform a long-press operation with the pressurization time T10 being long as a second operation.

Note that the input button 80 is attached to, for example, a front cover (operation console cover) 151 provided forward of the operator's seat 10. The display 45, the setting switch 51, the steering changeover switch 52, a correction switch 53, a shuttle lever 91, and so forth are also attached to the operation console cover 151.

The display 45 (controller 46) performs transition among the plurality of setting screens M3 when a long-press operation is performed, performs movement of the cursor K10 to a desired setting item preselected from among the plurality of setting items 70*a* to 70*h* when a short-press operation is performed on the setting screen M3 after the transition, and further makes a determination of the desired setting item by performing a long-press operation with the cursor K10 positioned at the desired setting item.

Specifically, as depicted in FIG. 8, on the home setting screen M3*a*, when a long-press operation is performed on the input button 80, as depicted in FIG. 8 and FIG. 9, the home setting screen M3*a* transits to the detail setting screen M3*b*. As depicted in FIG. 9, on the detail setting screen M3*b*, the position of the cursor K10 is changed every time a short-press operation is performed on the input button 80, and the cursor K10 can be positioned at a desired setting item preselected from among the plurality of setting items 70*a* to 70*h*.

In FIG. 9, when a long-press operation is performed on the input button 80 with the cursor K10 being positioned at the setting item 70*a* indicating sensitivity, the setting item 70*a* indicating sensitivity is determined and, as depicted in FIG. 10A, the detail setting screen M3*b* transits to the detail setting screen M3*b*1 for setting the reference adjacency width L11.

Also, in FIG. 9, when a long-press operation is performed on the input button 80 with the cursor K10 being positioned at the setting item 70*f* indicating the reference adjacency width L11, the setting item 70*f* indicating the reference adjacency width L11 is determined and, as depicted in FIG. 10B, the detail setting screen M3*b* transits to the detail setting screen M3*b*2 for setting the variation adjacency width L12.

Figure 10C:
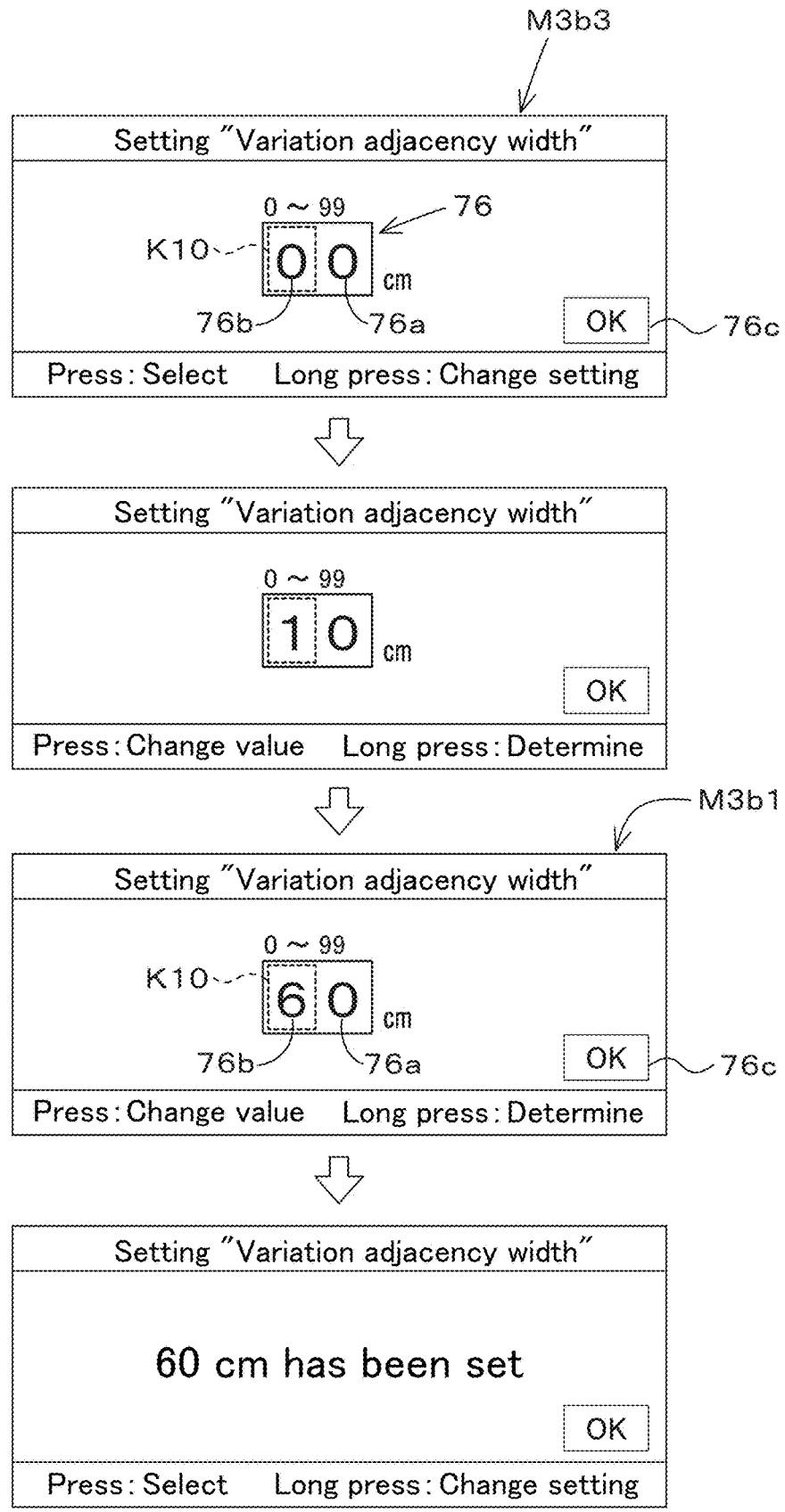
FIG. 10C is a diagram depicting one example of a detail setting screen M3b3.

Also, in FIG. 9, when a long-press operation is performed on the input button 80 with the cursor K10 being positioned at the setting item 70*g* indicating the variation adjacency width L12, the setting item 70*g* indicating the variation adjacency width L12 is determined and, as depicted in FIG. 10C, the detail setting screen M3*b* transits to the detail setting screen M3*b*3 for setting sensitivity.

As depicted in FIG. 10A, on the setting screen for setting a set value (detail setting screen M3*b*1), when a short-press operation is performed, the display 45 causes the cursor K10 to be moved to any of the plurality of set values (sensitive, normal, insensitive) and, when a long-press operation is performed with the cursor K10 positioned at a predetermined set value, makes a determination of the desired set value. For example, when a long-press operation is performed with the cursor K10 moved to sensitive with a short-press operation, the set value can be set in a sensitive manner.

As depicted in FIGS. 10B and 10C, on the setting screen for setting a set value (detail setting screen M3*b*2, detail setting screen M3*b*3), when a short-press operation is performed, the display 45 causes the cursor K10 to be moved to a desired digit preselected from among the plurality of digits as a set value, and when a long-press operation is performed with the cursor K10 positioned at the desired digit, makes a determination of the desired digit and, furthermore, changes the numerical value of the desired digit when a short-press operation is performed after the desired digit is determined.

As depicted in FIG. 10B, on the reference input portion 75 of the detail setting screen M3*b*2, when a short-press operation is performed on the input button 80, the cursor K10 can be moved to any of the first-digit input portion 75*a*, the second-digit input portion 75*b*, the third-digit input portion 75*c*, and the determination portion 75*d*. For example, on the third-digit input portion 75*c*, when a long-press operation is performed on the input button 80, the third digit is determined. After the third digit is determined, every time a short-press operation is performed on the input button 80, the number is count up by one, and the third digit number can be changed to any of 0 to 9. On the reference input portion 75, after numerical values are inputted to the first-digit input portion 75*a*, the second-digit input portion 75*b*, and the third-digit input portion 75*c*, a long-press operation is performed with the cursor K10 moved to the determination portion 75*d*, thereby allowing the numerical values inputted to the first-digit input portion 75*a*, the second-digit input portion 75*b*, and the third-digit input portion 75*c* to be set as the reference adjacency width L11.

Also, as depicted in FIG. 10C, on the variation input portion 76 of the detail setting screen M3*b*3, when a short-press operation is performed on the input button 80, the cursor K10 can be moved to any of the first-digit input portion 76*a*, the second-digit input portion 76*b*, and the determination portion 76*c*. When a long-press operation is performed on the input button 80, the first-digit input portion 76*a* or the second-digit input portion 76*b* can be determined. After the first-digit input portion 76*a* or the second-digit input portion 76*b* is determined, when a short-press operation is performed on the input button 80, the number can be changed to any of 0 to 9. On the variation input portion 76, after numerical values are inputted to the first-digit input portion 76*a* and the second-digit input portion 76*b*, a long-press operation is performed with the cursor K10 moved to the determination portion 76*c*, thereby allowing the numerical values inputted to the first-digit input portion 76*a* and the second-digit input portion 76*b* to be set as the variation adjacency width L12.

Figure 11:
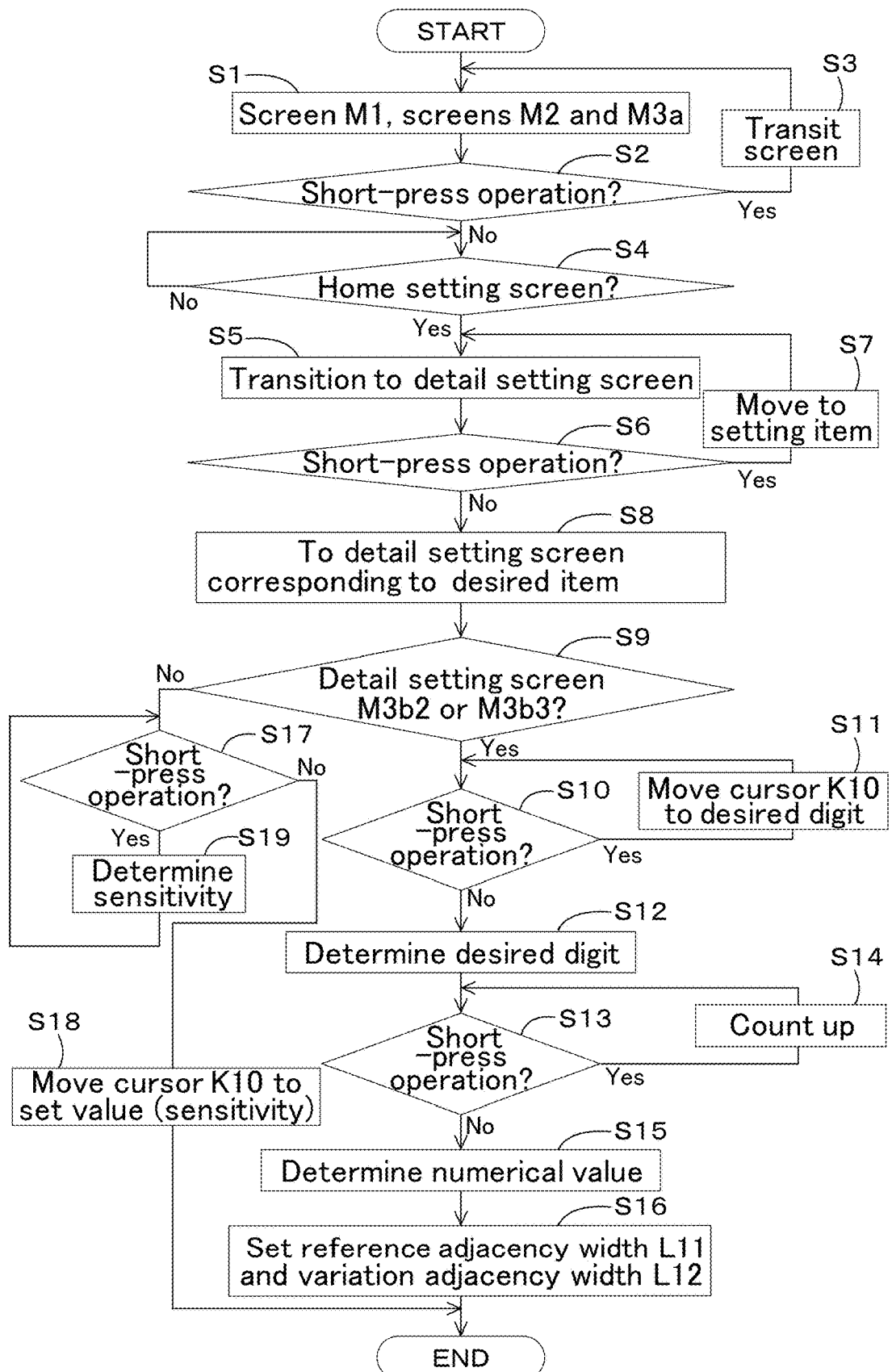
FIG. 11 is a diagram depicting an operation flow by operation on an input button.

FIG. 11 is a diagram summarizing an operation flow by operation of the input button 80.

In FIG. 11, when a short-press operation is performed (aas2, YES) on any of the operation screen M1, the guidance screen M2, and the home setting screen M3*a* (S1), transition is sequentially performed among the operation screen M1, the guidance screen M2, and the home setting screen M3*a* (S3). When not a short-press operation but a long-press operation is performed (S2, No), it is determined whether the present screen when the long-press operation is performed is the home setting screen M3*a* (S4). When the present screen is the home setting screen M3*a* (S4, Yes), the screen is transited to the detail setting screen M3*b* (S5). On the detail setting screen M3*b*, when a short-press operation is performed (S6, Yes), the cursor K10 is moved, that is, moved to a predetermined setting item from among the plurality of setting items 70*a* to 70*h* (S7). When not a short-press operation but a long-press operation is performed (S6, No), the desired setting item is determined, and the screen is transited to one of the detail setting screens M3*b*1 to M3*b*3 in accordance with the desired setting item (S8). When the detail setting screen M3*b*2 or M3*b*3 is displayed (S9, Yes), it is determined whether the performed operation is a short-press operation (S10). When the performed operation is a short-press operation (S10, Yes), the cursor K10 is moved to a desired digit preselected from among a plurality of digits (S11). When a short-press operation but a long-press operation is performed (S10, No), the desired digit is determined (S12). When a short-press operation is performed (S13, Yes), a numerical value of the desired digit is counted up (S14). When not a short-press operation but a long-press operation is performed (S13, No), the numerical value of the desired digit is determined (S15). When a long-press operation is performed with the cursor K10 moved to the determination portion 75d or the determination portion 76c, the reference adjacency width L11 or the variation adjacency width L12 can be set (S16). Note that the steps S11 to S15 can be repeatedly performed.

When neither the detail setting screen M3b2 nor M3b3 is displayed, that is, the detail setting screen M3b1 is displayed (S9, No), it is determined whether the performed operation is a short-press operation (S17). When the performed operation is a short-press operation (S17, Yes), the cursor K10 is moved to a desired set value (sensitivity) preselected from among the plurality of set values (sensitivity) (S19). When not a short-press operation but a long-press operation is performed (S17, No), the desired set value (sensitivity) is determined (S18).

As described above, with a short-press operation and a long-press operation on one input button 80, it is possible to not only transit the screen among the plurality of setting screens M3 but also change the set value. Note that the input button 80 can cause transition to another screen, other than the transition among the plurality of setting screens M3. For example, transition between the operation screen M1 and the guidance screen M2 can be performed.

Figure 12:
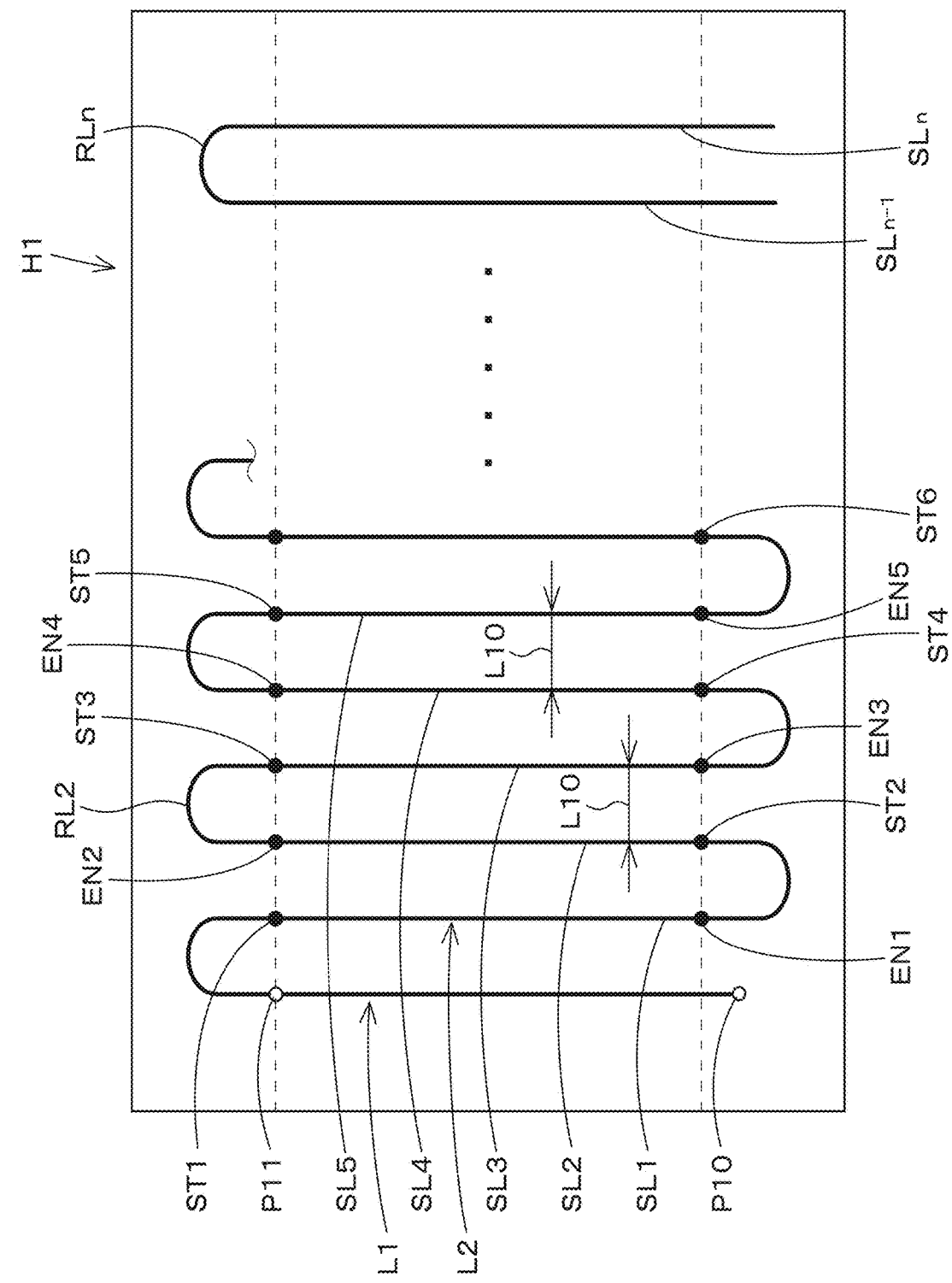
FIG. 12 is a diagram depicting a traveling path of the tractor with a start point and an end point of automatic steering being set.

Meanwhile, when a work (ground work) is performed in an agricultural field H1, the working device 2 corresponding to the work is coupled to the tractor 1, and the tractor 1 with the working device 2 coupled thereto is caused to travel in the agricultural field H1. As depicted in FIG. 12, for example, when a ground work is performed in the agricultural field H1, the work is performed as straight forwarding and turning are repeated as indicated by the scheduled traveling line L2. That is, the tractor 1 goes straight forward after turning when approaching a furrow end, and turns again to approach an opposite furrow end and then goes straight forward. Note that at the time of turning, the working device 2 in a working posture is raised, and no work is performed in the turning region.

In this manner, in performing the work as repeatedly turning, automatic steering is performed in straight-forwarding regions SLn (n is equal to 1, 2, 3 . . . ) represented as the scheduled traveling line L2. For example, in a first straight-forwarding region SL1, the operator operates the steering changeover switch 52 so that automatic steering starts at a start position ST1 (STn: n is equal to 1). Then, the operator, while viewing a working state, operates the steering changeover switch 52 so that automatic steering terminates at an end position EN1 (ENn: n is equal to 1). Also, the operator operates the correction switch 53 in accordance with the situation of automatic steering in the first straight-forwarding region SL1, thereby finely adjusting the vehicle-body position of the tractor 1, and the operator operates the accelerator 210 and the speed-shift member 211 in accordance with the work situation to adjust the vehicle speed of the tractor 1.

Also, after termination of automatic steering at the end position EN1, the operator performs manual steering of the tractor 1 for turning and operates the steering changeover switch 52 in a second straight-forwarding region SL2 to start automatic steering at a start position ST2, and operates the steering changeover switch 52 to terminate automatic steering at an end position EN2. That is, in the agricultural field H1, the tractor 1 is manually steered to travel in a turning region RLn connected with the straight-forwarding regions.

As described above, by operating the steering changeover switch 52 at the start positions STn (n is equal to 1, 2, 3 . . . ) and the end positions ENn (n is equal to 1, 2, 3 . . . ), the work is performed while automatic steering and manual steering are alternately repeated.

The scheduled traveling line L2 is set by a traveling line setter 201. The traveling line setter 201 is configured of an electric and electronic circuit provided in the second controller 60B, a program stored in a CPU or the like, or so forth. Note that the traveling line setter 201 may be provided in the first controller 60A or the third controller 60C and is not restrictive. The traveling line setter 201 sets the scheduled traveling line L2 based on the traveling reference line L1. That is, the traveling line setter 201 sets the straight-forwarding region SLn parallel to the traveling reference line L1 every time automatic steering is started. For example, when the first automatic steering is started (in the case of n is equal to 1), the traveling line setter 201 sets the straight-forwarding region SL1 that has a predetermined distance from the traveling reference line L1. An adjacency width L10 between the traveling reference line L1 and the straight-forwarding region SL1 is set at the reference adjacency width L11. Also, for example, when the second automatic steering onward is started (in the case of n is equal to 2 or larger), the traveling line setter 201 sets the straight-forwarding region SLn (n is equal to 2 or larger) that has a predetermined distance from the traveling reference line L1.

Here, the traveling line setter 201 can change the adjacency width L10 between adjacent scheduled traveling lines L2 among the plurality of scheduled traveling lines L2. That is, the traveling line setter 201 can change the adjacency width L10 between an immediately-previous straight-forwarding region SLn−1 (n is equal to 2 or larger) and an adjacent straight-forwarding region SLn (n is equal to 2 or larger) adjacent to the immediately-previous straight-forwarding region SLn−1 (n is equal to 2 or larger).

As depicted in FIG. 1, the tractor 1 includes a changing operation controller 81. The changing operation controller 81 is an ON/OFF switch, which issues therefrom an instruction to change the adjacency width L10 when it is turned on, and which does not issues therefrom an instruction to change the adjacency width L10 when it is turned off.

When an instruction to change is issued from the changing operation controller 81, when a change instruction is issued, the traveling line setter 201 changes the adjacency width L10. For example, when a change instruction is issued while the automatic steering is performed, the traveling line setter 201 changes the adjacency width L10 between the straight-forwarding region SLn−1 (n is equal to 2 or larger) where current automatic steering is being performed and the next straight-forwarding region SLn (n is equal to 2 or larger). In more detail, the traveling line setter 201 sets a value obtained by adding the variation adjacency width L12 to the reference adjacency width L11 as the adjacency width L10 (L10 is equal to L11 plus L12). For example, when automatic traveling is performed in the third straight-forwarding region SL3 and a the changing operation controller 81 is turned on to issue a changing instruction that is an instruction to change of the adjacency width, the traveling line setter 201 determines the adjacency width L10 between the third straight-forwarding region SL3 where current automatic steering is performed and the next fourth straight-forwarding region SL4 as not equal to L11 but equal to L11 plus L12. When the changing instruction is not issued for the next fourth straight-forwarding region SL4, the adjacency width L10 from the fifth straight-forwarding region SL5 is returned to the reference adjacency width L11.

Note that also when the changing operation controller 81 is operated at a time before start of automatic steering, e.g., during turning after termination of preceding automatic steering, the traveling line setter 201 sets the adjacency width L10 between the immediately-preceding straight-forwarding region SLn−1 ("n" is equal to 2 or larger) where automatic traveling has already been performed and the next straight-forwarding region SLn at L10 being equal to L11 plus L12. Also, when the changing instruction is not issued from the changing operation controller 81, the traveling line setter 201 determines the reference adjacency width L11 as the adjacency width L10.

Figure 13:
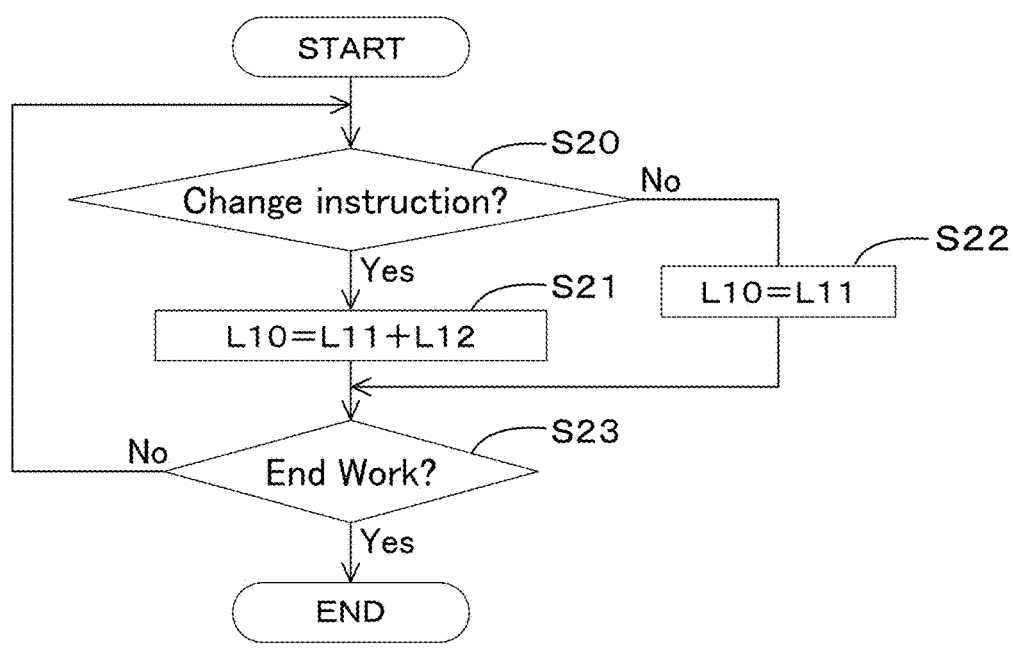
FIG. 13 is a diagram depicting a flow of changing an adjacency width L10 by a changing operation controller.

FIG. 13 is a diagram depicting a flow of changing the adjacency width L10 by the changing operation controller 81.

In FIG. 13, either during automatic steering or after automatic steering is terminated, it is determined whether the changing instruction is issued (S20). When the changing instruction is issued (S20, Yes), the traveling line setter 201 changes the adjacency width L10 to a value obtained by adding the variation adjacency width L12 to the reference adjacency width L11 as the adjacency width L10 in the next-scheduled traveling line L2c (S21). When the changing instruction is not issued (S20, No), the traveling line setter 201 fixes the adjacency width L10 at the reference adjacency width L11 and does not make a change in the next-scheduled traveling line L2c (S22). When the work ends (S23, Yes), the traveling line setter 201 ends the process. When the work does not end, the process returns to S20. As depicted in FIG. 13, the adjacency width L10 of the next-scheduled traveling line L2c is allowed to change when the changing instruction is issued, and the adjacency width L10 of the next-scheduled traveling line L2c is not allowed to change when the changing instruction is not performed.

Note that the correction switch 53 may serve as the changing operation controller 81. The correction switch 53 is a switch for correcting the vehicle-body position (positioning position) found by the positioning device 40, and is a switch swingable to one side (left side) and the other side (right side). The correction switch 53 is, for example, a switch configured so that, when it is short-pressed to swing to the left side, the positionally detected position is correctly shifted to the right side of the vehicle body 3 so as to cause the tractor 1 (vehicle body 3) to turn to the left side by automatic steering, and when it is short-pressed to swing to the right side, the positionally detected position is correctly shifted to the left side of the vehicle body 3 so as to cause the tractor 1 (vehicle body 3) to turn to the right side by automatic steering. The changing instruction may be issued when the correction switch 53 is long-pressed to swing to the left or right side.

Also, the display 45 may serve as the changing operation controller 81. For example, an adjacency width change icon may be provided on the screen of the display 45 and a changing instruction may be issued when the icon is pressed.

Meanwhile, while the adjacency width L10 is changed by manually operating the changing operation controller 81 in the above-described preferred embodiment, the adjacency width L10 may be changed automatically.

The tractor 1 includes a calculator 202. The calculator 202 calculates a work count of performing a ground work (the number of ground works). For example, since the tractor 1 performs a work (ground work) as going straight forward, a total of the number of traveling reference lines L1 and the number of straight-forwarding regions SLn can be taken as a number of works (work count) WTi in the agricultural field H1. That is, the work count WTi can be represented as being equal to the number of traveling reference lines L1 plus the number of straight-forwarding regions SLn. Note that since the traveling reference line L1 may be set without performing a work, the work count WTi may be the number of straight-forwarding regions SLn without including the number of traveling reference lines L1.

Specifically, the calculator 202 takes the number of times of switching of the steering changeover switch 52 to either of the position for start of automatic steering and the position for termination of automatic steering as the work count WTi. For example, after setting of the traveling reference line L1 is completed, the calculator 202 sets the number of times of selecting a start of automatic steering by use of the steering changeover switch 52 (start switching count) as the work count WTi. In other words, calculator 202 sets the number "n" of the start position STn at the work count WTi.

Alternatively, after setting of the traveling reference line L1 is completed, the calculator 202 sets the number of times of selecting a termination of automatic steering by use of the steering changeover switch 52 (termination switching count) as the work count WTi. In other words, calculator 202 sets the number "n" of the end position ETn at the work count WTi.

Alternatively, the calculator 202 may set the number of times of turnings of the vehicle body 3 by manual steering (termination switching count) as the work count WTi. For example, after the traveling reference line L1 is set, the calculator 202 determines whether manual steering is being performed. When determining that manual steering is being performed, the calculator 202 monitors the steering angle of the steering device 11 in manual steering. Then, when the steering angle of the steering device 11 in manual steering becomes equal to or larger than a turn threshold value (value allowing a determination that turning is being performed), it is determined that the vehicle body 3 turns and the turn count is kept. In other words, the calculator 202 sets the number "n" of the turn region RLn on the scheduled traveling line L2 at the work count WTi.

Note that which of the start switching count, termination switching count, and termination switching count is set at the work count WTi can be set on the setting screen or the like of the display 45. As depicted in FIGS. 7A to 7C, on the turn guidance screen M2a, the work count WTi may be displayed in a count display portion 90.

When the work count WTi calculated by the calculator 202 reaches a predetermined count, the traveling line setter 201 changes the adjacency width L10. Specifically, the traveling line setter 201 changes the adjacency width L10 to a value obtained by adding the variation adjacency width L12 to the reference adjacency width L11 when the work count WTi reaches the predetermined count, and changes the reference adjacency width L11 to the adjacency width L10 when the work count WTi does not reach the predetermined count. For example, when the work count WTi in the straight-forwarding region SLn−1 (n is equal to or larger than 2) where current automatic steering is being performed is ten and the predetermined count is ten, the adjacency width L10 between the straight-forwarding region SLn−1 (n is equal to or larger than 2) and the next straight-forwarding region SLn (n is equal to or larger than 2) is set at not L10 being equal to L11 but L10 being equal to L11 plus L12.

Figure 14:
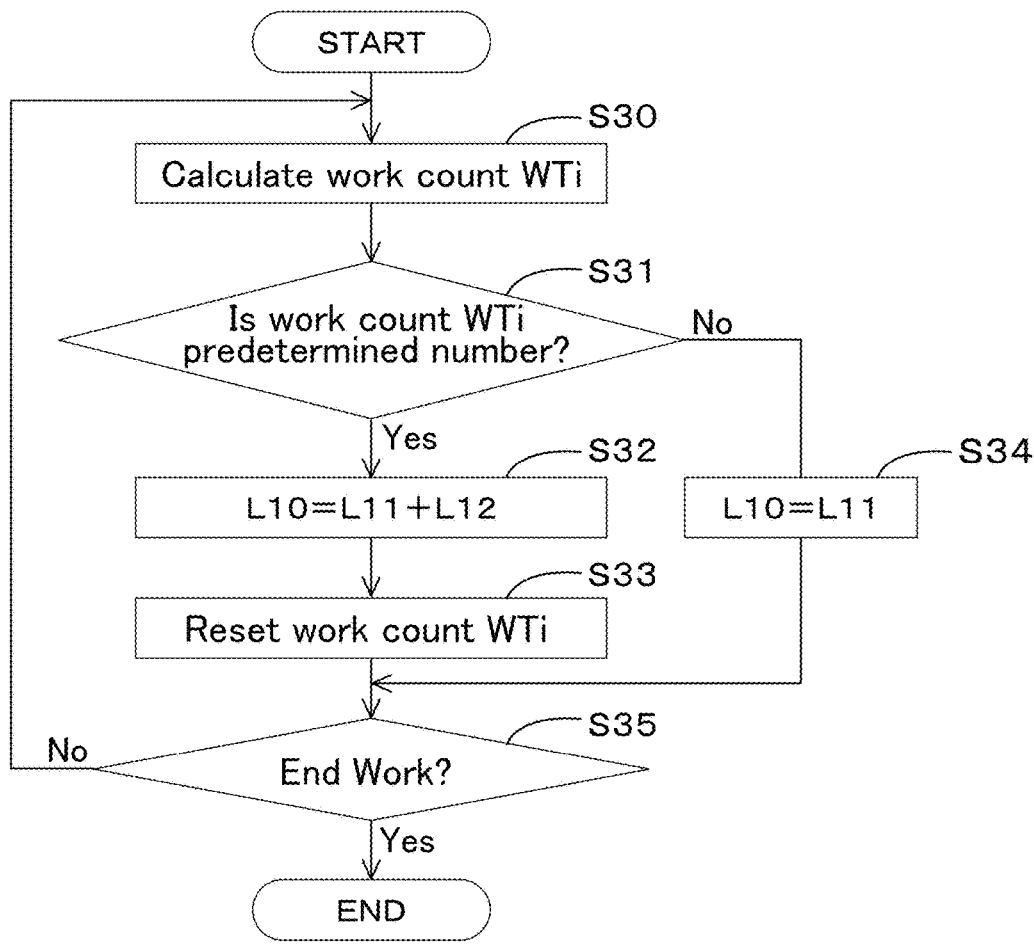
FIG. 14 is a diagram depicting a flow of automatically changing the adjacency width L10.

FIG. 14 is a diagram depicting a flow of automatically changing the adjacency width L10.

In FIG. 14, the work count WTi is calculated by the calculator 202 (S30). It is determined whether the work count WTi has reached a predetermined count defined in advance (S31). If the work count WTi has reached the predetermined count (S31, Yes), the traveling line setter 201 changes the adjacency width L10 to a value obtained by adding the variation adjacency width L12 to the reference adjacency width L11 in the next scheduled traveling line L2c (S32). After changing the adjacency width L10, the traveling line setter 201 resets the work count WTi (S33). If the work count WTi has not reached the predetermined count (S31, No), the traveling line setter 201 fixes the adjacency width L10 at the reference adjacency width L11 and does not make a change in the next scheduled traveling line L2c (S34). When the work ends (S35, Yes), the traveling line setter 201 ends the process. When the work does not end, the process returns to S30. As depicted in FIG. 14, for each work count, the adjacency width L10 of the next scheduled traveling line L2c can be changed. Note that the predetermined count can be set on the setting screen of the display 45.

As depicted in FIGS. 7A to 7C, when the adjacency width L10 is changed, that is, when the variation adjacency width L12 is added to the reference adjacency width L11, the next line indicating graphic 68b different from the next line indicating graphic 68a is displayed on the turn guidance screen M2a. The next line indicating graphic 68a is the straight-forwarding region SLn−1 (n is equal to 2 or larger) when the adjacency width L10 is the reference adjacency width L11, and the next line indicating graphic 68b is the straight-forwarding region SLn (n is equal to 2 or larger) when the adjacency width L10 is the reference adjacency width L11 added with the variation adjacency width L12. With this, when the next line indicating graphic 68b is displayed on the turn guidance screen M2a, the operator can grasp that the adjacency width L10 is extended (changed) for the next-scheduled traveling line L2c.

Meanwhile, when the adjacency width L10 is changed, the interrow assist for guiding the tractor 1 (vehicle body 3) to the next-scheduled traveling line L2c by automatic steering becomes different. As depicted in FIG. 1, the tractor 1 includes a first assist controller 204 and a second assist controller 205. The first assist controller 204 and the second assist controller 205 are configured of electric and electronic circuits provided in the second controller 60B, a program stored in a CPU or the like, or so forth. Note that they may be provided in the first controller 60A or the third controller 60C and are not restrictive.

Figure 15A:
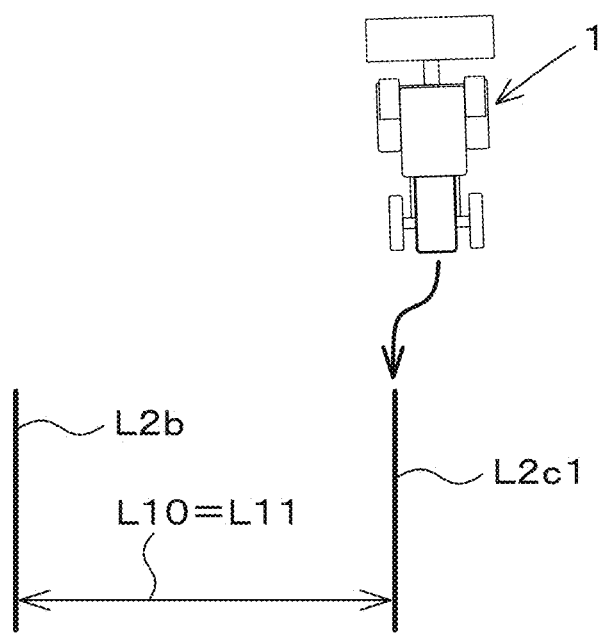
FIG. 15A is a diagram depicting an interrow assist when the adjacency width L10 is not changed.

As depicted in FIG. 15A, when the adjacency width L10 is unchanged, after automatic steering is terminated, separately from the automatic steering controller 200, the first assist controller 204 automatically guides the vehicle body 3 to a next-scheduled traveling line L2c1 (straight-forwarding region SLn−1 ("n" is equal to 2 or larger)) with the unchanged adjacency width L10. The first assist controller 204 refers to the vehicle-body position detected by the positioning device 40 to automatically change the steering angle so that the vehicle-body position approaches the next-scheduled traveling line L2c1 and match the vehicle-body position with the next-scheduled traveling line L2c1.

Figure 15B:
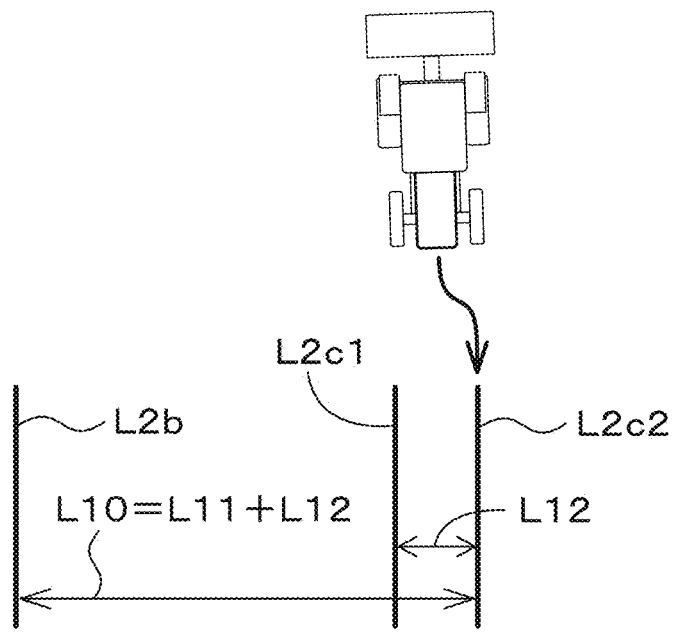
FIG. 15B is a diagram depicting an interrow assist when the adjacency width L10 is changed.

As depicted in FIG. 15B, when the adjacency width L10 is changed, after automatic steering is terminated, separately from the automatic steering controller 200, the second assist controller 205 automatically guides the vehicle body 3 to a next-scheduled traveling line L2c2 (straight-forwarding region SLn ("n" is equal to 2 or larger)) with the changed adjacency width L10. The second assist controller 205 refers to the vehicle-body position detected by the positioning device 40 to automatically change the steering angle so that the vehicle-body position approaches the next-scheduled traveling line L2c2 and matches the vehicle-body position with the next-scheduled traveling line L2c2.

While the automatic steering during forward traveling of the tractor 1 (vehicle body 3) has been described in the above-described preferred embodiment, it is also possible to perform the automatic steering during rearward traveling of the tractor 1 (vehicle body 3). When rearward traveling by the automatic steering is to be performed, the shuttle lever 91 disposed in the vicinity of the operator's seat 10 is first switched from a neutral position to a rearward-traveling side, and a forward-rearward traveling switching portion 13 is switched to a rearward-traveling side. During the rearward traveling, the operator performs manual steering to satisfy the condition for automatic steering so as to make the azimuth difference ΔF3 between the vehicle-body azimuth F1 and the line azimuth F2 equal to or smaller than a predetermined value, in the same way as that during forward traveling.

When forward traveling by the automatic steering is to be performed, the operator viewing the display 45 disposed forward of the driver's seat 10 performs manual steering so as to satisfy the condition for automatic steering. On the other hand, when rearward traveling by the automatic steering is to be performed, the operator viewing rearward performs manual steering so as to satisfy the condition for automatic steering, and thus it is difficult to view the display 45 disposed forward of the operator's seat 10. Thus, the tractor 1 includes a notification device 95 for issuing a notification of information about automatic steering aside from the display 45 disposed forward of the operator's seat 10. The notification device 95 is configured of a device outputting sound (voice), e.g., a loudspeaker or a buzzer, or for a device outputting light, e.g., a lamp or an LED, or the like. The notification device 95 is disposed in the perimeter of the operator's seat 10 when the device is the loudspeaker or the buzzer, and is disposed on a lateral side or rearward of the operator's seat 10 when the device is the lamp or the LED.

Figure 16:
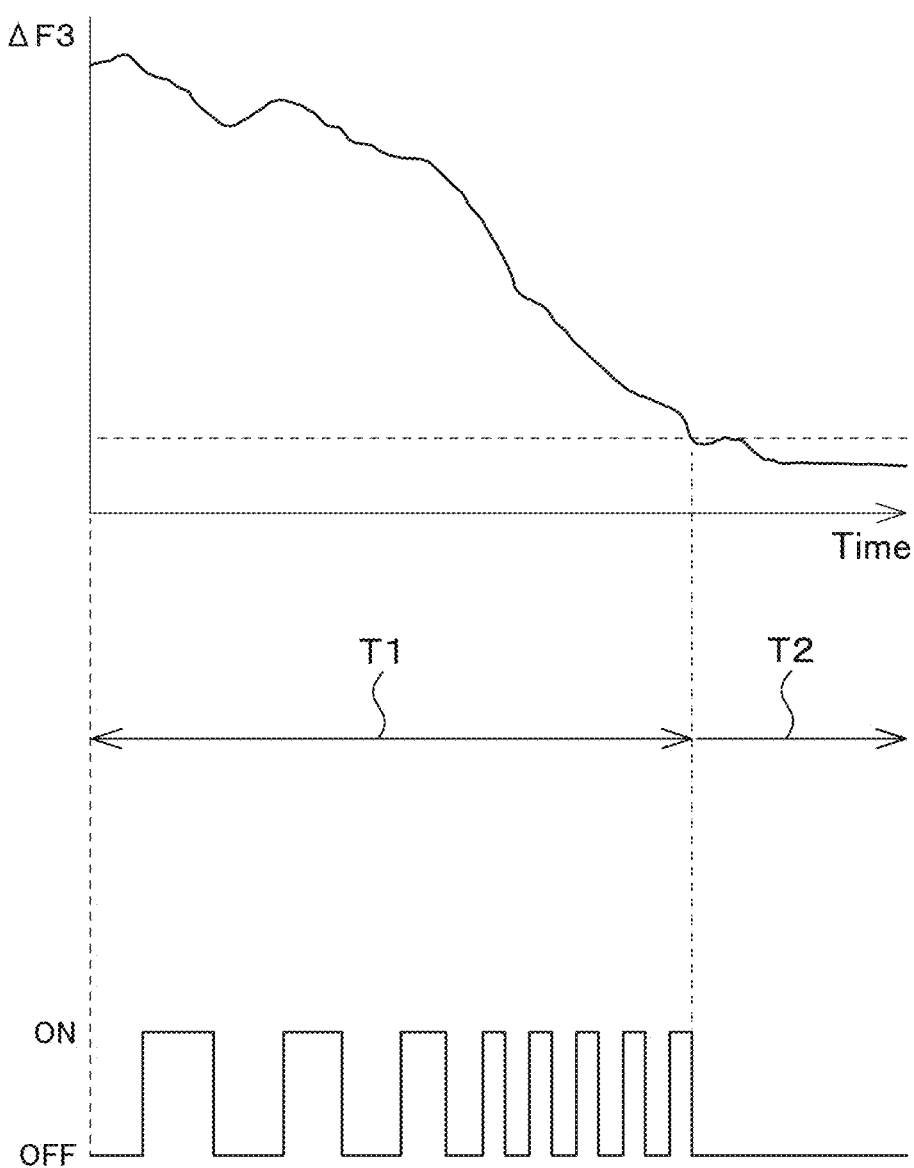
FIG. 16 is a diagram depicting operation of a notification device.

When rearward traveling by the automatic steering is to be performed, the notification device 95 issues a notification, by using sound or light, as to whether the condition for starting automatic steering is satisfied. For example, as depicted in a section T1 of FIG. 16, as the azimuth difference ΔF3 decreases, an ON (output)/OFF (stop) interval of the loudspeaker, buzzer, lamp, or LED is shortened. That is, as the azimuth difference ΔF3 decreases, the interval of outputting sound is shortened for the loudspeaker or the buzzer, or the interval of lighting is shortened for the lamp or the LED. As depicted in a section T2 of FIG. 16, when the azimuth difference ΔF3 is equal to or smaller than the predetermined value and the condition for automatic steering is satisfied, the ON/OFF interval of the loudspeaker, buzzer, lamp, or LED is retained. That is, as depicted in the sections T1 and T2, the notification device 95 makes the sound or light mode after the condition for automatic steering is satisfied different from the sound or light mode before the condition for automatic steering is satisfied. As depicted in a section T3 of FIG. 16, when rearward traveling using automatic steering is started, the notification device 95 stops (turns OFF) outputting.

Note that as depicted in FIG. 18, in addition to the notification device 95, a notification device 96 may be provided at a rear portion of the tractor 1 (vehicle body 3) to notify the outside that the tractor 1 is to travel rearward by automatic steering. Also, the notification device 95 may serve as the notification device 96. When serving as the above, the notification device 95 does not stop outputting.

When forward traveling using automatic steering is to be performed, for example, when the shuttle lever 91 is switched to a forward-traveling side after the traveling reference line L1 is registered, the display 45 displays the turn guidance screen M2a indicating the condition to be satisfied for starting automatic steering. On the other hand, when rearward traveling using automatic steering is to be performed, for example, when the shuttle lever 91 is switched to a rearward traveling side after the traveling reference line L1 is registered, the display 45 displays a screen at least different from the turn guidance screen M2a, for example, the operation screen M1 or a screen M5 for encouraging a look rearward. On the screen M5, for example, a display is made indicating "Please look rearward because of rearward traveling using automatic steering", or the like. In this manner, when rearward traveling using automatic steering is to be performed, the operator attends not to the display 45 but to the notification device 95, thereby improving operability of automatic-steering during rearward traveling.

The working vehicle 1 includes the vehicle body 3 capable of traveling either by manual steering with the steering wheel 30 or by automatic steering with the steering wheel 30, the reference registration controller 150 which registers the traveling reference line L1 based on the position of the vehicle body 3 caused to travel by the manual steering, the traveling line setter 201 to set, based on the traveling reference line L1, the plurality of scheduled traveling lines L2 for traveling using the automatic steering, and the automatic steering controller 200 to control the automatic steering based on the scheduled traveling lines L2. The traveling line setter 201 is configured or programmed to change the adjacency width L10 between scheduled traveling lines L2 adjoining each other among the plurality of scheduled traveling lines L2. According to this, for example, in a situation in which a work is performed by using automatic steering, the adjacency width L10 can be changed in accordance with the working situation and so forth. For example, when a passage is required for traveling of another tractor (vehicle body) in the agricultural field to perform pest control, the adjacency width is increased or decreased in accordance with the size of the other tractor, thereby allowing the passage for the subsequent work or the like to be allocated. Alternatively, automatic steering can be performed in accordance with various situations, such as when it is required to partially change the ridge width.

The working vehicle 1 includes the changing operation controller 81 operable to issue an instruction to change of the adjacency width L10. The traveling line setter 201 is configured or programmed to change the adjacency width L10 when the instruction to change is issued from the changing operation controller 81. According to this, the adjacency width L10 can be changed only when the instruction to change is issued by the changing operation controller 81 used by the operator or the like.

The working vehicle 1 includes the calculator 202 to calculate the work count WTi that is a count of a number of times of performing a ground work. The traveling line setter 201 is configured or programmed to change the adjacency width L10 based on a predetermined count reached by the work count WTi calculated by the calculator 202. According to this, the adjacency width L10 can be automatically changed every time the work count WTi becomes the predetermined count.

The working vehicle 1 includes the display 45 having the reference input portion 75 to input the reference adjacency width L11, which is a reference width between the scheduled traveling lines L2 adjoining each other, and the variation input portion 76 to input the variation adjacency width L12.

The traveling line setter 201 is configured or programmed to change the adjacency width based on the reference adjacency width L11 and the variation adjacency width L12. According to this, for example, each of the reference adjacency width L11 and the variation adjacency width L12 can be easily set, and the adjacency width L10 can be easily changed with the variation adjacency width L12 only when it is required to change the adjacency width L10 while automatic steering is performed with the reference adjacency width L11.

The traveling line setter 201 is configured or programmed to change the adjacency width L10 to a value obtained by adding the variation adjacency width L12 to the reference adjacency width L11 when the instruction to change is issued by the changing operation controller 81, and set the reference adjacency width L11 as the adjacency width L10 when the instruction to change is not issued by the changing operation controller 81. According to this, for example, each of the reference adjacency width L11 and the variation adjacency width L12 can be easily set, and the adjacency width L10 can be easily changed with the variation adjacency width L12 only when the instruction to change is issued from the changing operation controller 81 by the operator or the like while automatic steering is performed with the reference adjacency width L11.

The traveling line setter 201 is configured or programmed to change the adjacency width L10 to a value obtained by adding the variation adjacency width L12 to the reference adjacency width L11 when the work count WTi calculated by the calculator 202 reaches the predetermined count, and set the reference adjacency width L11 as the adjacency width L10 when the work count WTi does not reach the predetermined count. According to this, for example, each of the reference adjacency width L11 and the variation adjacency width L12 can be easily set, and the adjacency width L10 can be easily changed automatically with the variation adjacency width L12 every time the work count WTi becomes the predetermined count, while automatic steering is performed with the reference adjacency width L11.

The working vehicle 1 includes the first assist controller 204 configured or programmed so that, when the adjacency width L10 is unchanged, the first controller 204 automatically guides, after the automatic steering is terminated, the vehicle body 3 to the scheduled traveling lines L2 with the unchanged adjacency width L10, and the second assist controller 205 configured or programmed so that, when the adjacency width L10 is changed, the second assist controller 205 automatically guides, after the automatic steering is terminated, the vehicle body 3 to the scheduled traveling lines L2 with the changed adjacency width L10. According to this, it is possible to not only facilitate entry of the working vehicle 1 into the scheduled traveling line L2 corresponding to the reference adjacency width L11 but also facilitate entry of the working vehicle 1 into the scheduled traveling line L2 with the changed adjacency width L10.

The working vehicle 1 includes the vehicle body 3 capable of traveling, the coupling portion 8 provided on the vehicle body 3 and configured to couple the work device to the vehicle body 3, the display 45 capable of displaying the plurality of setting screens M3 for inputting or displaying setting information including the setting items 70a to 70h and the set values 71a to 71h regarding settings regarding the vehicle body 3, and the input button 80 for inputting setting information and transition among the plurality of setting screens M3 with the first operation and the second operation. According to this, with only two operations, the first operation and the second operation, it is possible to input setting information including the setting items 70a to 70h and the set values 71a to 71h, and transit the setting screens M3. That is, screen transition and setting can be performed with the least number of buttons (input button 80), and it is thus possible not only to decrease the number of members but also to make the space of the input button and so forth compact.

The input button 80 is configured to be operated by the first operation, which is a short-press operation performed for a short pressurization time, or the second operation, which is a long-press operation performed for a long pressurization time that is longer than the first operation. According to the long-press operation, the display 45 performs transition among the plurality of setting screens M3. According to the short-press operation, on the setting screen M3 after the transition, the cursor moves to a desired setting item preselected from among the plurality of setting items 70a to 70h. Furthermore, when the long-press operation is performed and the cursor is positioned on the setting item, the desired setting item is determined. According to this, by the long-press operation, the transition among the plurality of setting screens M3 and determination of one of the setting items 70a to 70h can be performed. When the short-press operation is performed, the desired setting item can be selected from among the plurality of setting items 70a to 70h. Operability can be improved because only one button is required.

The display 45 is capable of displaying a screen different from the setting screens M3. The input button 80 is switched by a short-press operation to transit the setting screen to another screen. According to this, a screen other than the setting screens M3 for inputting setting information can be displayed by a short-press operation and, also in view of this, operability can be improved.

The display 45 moves the cursor K10 to a predetermined digit among the plurality of digits of the set value when a short-press operation is performed on the setting screen for setting the set value (detail setting screen M3b2, detail setting screen M3b3); with the cursor K10 being positioned at a predetermined digit, determines that predetermined digit when a long-press operation is performed; and, furthermore, after determining the predetermined digit, when a short-press operation is performed, changes the numerical value of the predetermined digit. According to this, when a set value having a plurality of digits is set, a predetermined digit can be determined among the plurality of digits with a long-press operation, and the predetermined digit and the numerical value can be changed with a short-press operation. That is, only with one button, a set value configured of a plurality of digits can be set with a long-press operation and a short-press operation.

The vehicle body 3 is capable of traveling by either manual steering with the steering wheel 30 or automatic steering with the steering wheel 30, and the display 45 displays the setting items 70a to 70h and the set values 71a to 71h regarding automatic steering as setting information. According to this, it is possible to not only easily confirm the setting items 70a to 70h and the set values 71a to 71h regarding automatic steering but also easily set the set values 71a to 71h for automatic steering with the input button 80.

The working vehicle 1 includes the reference registration controller 150, the traveling line setter 201, and the automatic steering controller 200. According to this, it is possible to easily set the traveling reference line L1, the scheduled traveling line L2 and perform automatic steering.

The display 45 displays the setting screen M3 for setting the adjacency width L10 between scheduled traveling lines L2 adjoining each other from among the plurality of scheduled traveling lines L2. According to this, with combination of the setting screen M3 and the input button 80, the set value of the adjacency width L10 can be easily displayed and set.

The working vehicle 1 includes the vehicle body 3, the reference registration controller 150, the automatic steering controller 200, the display 45 configured or programmed to display information about automatic steering when rearward traveling by the automatic steering is to be performed, the notification device 95 configured or programmed to issue a notification about automatic steering aside from the display 45 when rearward traveling by the automatic steering is to be performed. According to this, when forward traveling by the automatic steering is to be performed, the operator who watches the display 45 can confirm information about the automatic steering, and additionally, when rearward traveling by the automatic steering is to be performed, the operator who does not watch the display 45 can use the notification device 95 to confirm information about the automatic steering.

The working vehicle 1 includes the steering changeover switch 52 operable to selectively start or terminate the automatic steering. After the automatic steering is terminated, and when forward traveling by the automatic steering is to be performed, the display 45 displays a guidance screen (turn guidance screen M2a) indicating the condition to be satisfied for starting the automatic steering. When rearward traveling by the automatic steering is to be performed, the notification device 95 issues a notification, by using sound or light, as to whether the condition for starting the automatic steering is satisfied. According to this, when forward traveling by the automatic steering is to be performed, the operator who watches the guidance screen (turn guidance screen M2a) can confirm the condition to be satisfied for starting the automatic steering, and when rearward traveling by the automatic steering is to be performed, the operator also can confirm the condition to be satisfied for starting the automatic steering due to the sound or light.

The display 45 displays a state in which the condition for starting automatic steering is satisfied on the guidance screen (turn guidance screen M2a) in accordance with the azimuth difference ΔF3 between the azimuth of the traveling reference line L1 and the azimuth of the vehicle body 3. According to this, when forward traveling using automatic steering is performed, the operator can easily confirm the situation of the azimuth difference ΔF3 between the azimuth of the traveling reference line L1 and the azimuth of the vehicle body 3 by viewing the guidance screen (turn guidance screen M2a).

The notification device 95 issues a notification as to whether the condition for starting automatic steering by changing the mode of sound or light in accordance with the azimuth difference ΔF3 between the azimuth of the traveling reference line L1 and the azimuth of the vehicle body 3. According to this, when rearward traveling by the automatic steering is to be performed, the operator can easily confirm the situation of the azimuth difference ΔF3 due to the sound or light.

When rearward traveling by the automatic steering is to be performed, the display 45 displays a screen at least different from the guidance screen (turn guidance screen M2a). According to this, the operator who intends to satisfy the condition for starting the automatic steering for rearward traveling is prevented from viewing the guidance screen (turn guidance screen M2a) for forward traveling.

When rearward traveling by the automatic steering is to be performed, the display 45 displays the screen M5 for encouraging a look rearward. According to this, when the operator watches the screen to satisfy the condition for starting rearward traveling by the automatic steering, attention can be called (encouraged) rearward, and the rearward traveling by the automatic steering can be smoothly performed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

In the above-described preferred embodiment, the adjacency extension width is set as the variation adjacency width L12 and, when an instruction to change is issued from the changing operation controller 81, the traveling line setter 201 is configured or programmed to change the adjacency width L10 to a value obtained by adding the variation adjacency width L12 to the reference adjacency width L11. However, it may be configured that a predetermined adjacency width is set as the variation adjacency width L12 and, when an instruction to change is issued by the changing operation controller 81, the traveling line setter 201 changes the adjacency width L10 to the value of the variation adjacency width L12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle, comprising:
   a vehicle body to travel either by manual steering with a steering wheel or by automatic steering with the steering wheel;
   a switch; and
   one or more controllers, including a circuit and/or a central processing unit (CPU), configured or programmed to:
      register a traveling reference line that is a straight line connecting a start point and an end point, the start point being defined as a position of the vehicle body at a time when the vehicle body is caused to travel by the manual steering and a first operation is performed on a registration switch, and the end point being defined as a position of the vehicle body at a time when a second operation is performed on the registration switch;
      set, based on the traveling reference line, a plurality of scheduled traveling lines for traveling using the automatic steering; and
      control the automatic steering with the steering wheel so that the vehicle body travels along the scheduled traveling lines; wherein
   the one or more controllers is operable to change an adjacency width between the scheduled traveling lines adjoining each other among the plurality of scheduled traveling lines;
   the switch is operable to issue therefrom an instruction to change the adjacency width;
   when the instruction to change the adjacency width is issued from the switch during the automatic steering, the one or more controllers changes the adjacency width to a changed adjacency width and changes a position of a next scheduled traveling line to a position spaced by the changed adjacency width from a current scheduled traveling line; and
   when the instruction to change the adjacency width is issued from the switch after a termination of the automatic steering and before a new automatic steering is started, the one or more controllers changes the adjacency width to the changed adjacency width and changes the position of the next scheduled traveling line to a position spaced by the changed adjacency width from an immediately preceding scheduled traveling line on which the vehicle body was traveling immediately before the termination of the automatic steering.

2. The working vehicle according to claim 1, further comprising:
   a display including a reference input portion to input a reference adjacency width, which is a reference width between the scheduled traveling lines adjoining each other, and a variation input portion to input a variation adjacency width; wherein
   the one or more controllers is operable to change the adjacency width to a value obtained by adding the variation adjacency width to the reference adjacency width when the instruction to change is issued from the switch, and sets the reference adjacency width as the adjacency width when the instruction to change is not issued from the switch.

3. The working vehicle according to claim 1, further comprising:
   a display including a reference input portion to input a reference adjacency width, which is a reference width between the scheduled traveling lines adjoining each other, and a variation input portion to input a variation adjacency width; wherein
   the one or more controllers, including the circuit and/or the CPU, are configured or programmed to calculate a work count that is a count of a number of times of performing a ground work;
   the one or more controllers is operable to change the adjacency width to a value obtained by adding the variation adjacency width to the reference adjacency width when the work count reaches a predetermined count, and resets the work count; and
   the one or more controllers is operable to set the reference adjacency width as the adjacency width when the work count does not reach the predetermined count.

4. The working vehicle according to claim 1, further comprising:
   a positioning device to detect a position of the vehicle body; wherein
   the one or more controllers, including the circuit and/or the CPU, are configured or programmed to:
      when the adjacency width is unchanged, after the automatic steering is terminated, and when a new automatic steering is started after the vehicle body is turned by the manual steering, refer to a vehicle body position representing the position of the vehicle body detected by the positioning device to change a steering angle of the vehicle body so that the vehicle body position approaches the next scheduled traveling line with the unchanged adjacency width and matches the next scheduled traveling line; and
      when the adjacency width is changed, after the automatic steering is terminated, and when a new automatic steering is started after the vehicle body is turned by the manual steering, refer to the vehicle body position detected by the positioning device to change the steering angle of the vehicle body so that the vehicle body position approaches the next scheduled traveling line with the changed adjacency width and matches the next scheduled traveling line.

5. The working vehicle according to claim 1, further comprising:
  a display to display information about the vehicle body; and
  a controller, including a circuit and/or a central processing unit (CPU), configured or programmed to cause the display to display a scheduled traveling line on which the vehicle body travels and a next-scheduled traveling line adjoining the scheduled traveling line; wherein
  when an adjacency width between scheduled traveling lines adjoining each other is changed, the controller is operable to cause the display to display the next-scheduled traveling line to be scheduled after the changing.

* * * * *